(12) United States Patent
Smithwick et al.

(10) Patent No.: US 12,386,196 B2
(45) Date of Patent: *Aug. 12, 2025

(54) VISUAL EFFECT SYSTEM INCLUDING PERSPECTIVE-CORRECT AUTOSTEREOSCOPIC RETROREFLECTIVE PROJECTION

(71) Applicant: DISNEY ENTERPRISES, INC., Burbank, CA (US)

(72) Inventors: Quinn Y. J. Smithwick, Pasadena, CA (US); Dawson McLeod Dill, Burbank, CA (US); Michael John Ilardi, Los Angeles, CA (US); Elisabeth C. Papadopoulos, Glendale, CA (US); Robert J. Bristow, Shadow Hills, CA (US); Colleen L. Bristow-Campbell, Shadow Hills, CA (US); Chad Michael Smith, San Dimas, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 617 days.

This patent is subject to a terminal disclaimer.

(21) Appl. No.: 17/827,541

(22) Filed: May 27, 2022

(65) Prior Publication Data

US 2022/0283445 A1 Sep. 8, 2022

Related U.S. Application Data

(63) Continuation of application No. 16/836,549, filed on Mar. 31, 2020, now Pat. No. 11,385,474.

(51) Int. Cl.
*G02B 30/33* (2020.01)
*G02B 27/00* (2006.01)
(Continued)

(52) U.S. Cl.
CPC ........ *G02B 30/33* (2020.01); *G02B 27/0093* (2013.01); *G02B 27/283* (2013.01);
(Continued)

(58) Field of Classification Search
CPC ........ G02B 30/33; G02B 30/25; G02B 30/24; G02B 27/0093; G02B 27/283;
(Continued)

(56) References Cited

U.S. PATENT DOCUMENTS

| 7,938,540 B2 | 5/2011 | Brentnall et al. |
| 10,001,654 B2 | 6/2018 | Joseph et al. |

(Continued)

*Primary Examiner* — Wyatt A Stoffa
*Assistant Examiner* — Grant A Gagnon
(74) *Attorney, Agent, or Firm* — Dorsey & Whitney LLP

(57) ABSTRACT

A system creating an autostereoscopic augmented reality (AR), virtual reality (VR), or other visual display experience involving 3D images, presented to a viewer without glasses or other head-gear. The system includes a projection screen, which includes a reflective surface formed using retroreflective material. The system includes a projection assembly and a beamsplitter, which is disposed between an outlet of the projection assembly and the projection screen. The system includes a physical scenic space facing a lower side of the beamsplitter and a viewing space facing an upper side of the beamsplitter. A controller operates the projector assembly to project left and right eye images toward the projection screen. The left and right eye images are then directed to left and right eye positions so a viewer with eyes positioned at the left and right eye positions perceives a virtual object concurrently with light from the physical scenic space.

38 Claims, 33 Drawing Sheets

(51) Int. Cl.
    *G02B 27/28*     (2006.01)
    *G02B 27/30*     (2006.01)
    *G02B 30/24*     (2020.01)
    *G02B 30/25*     (2020.01)
    *G03B 21/00*     (2006.01)
    *G03B 21/20*     (2006.01)
    *G03B 21/60*     (2014.01)

(52) U.S. Cl.
    CPC ........... *G02B 27/286* (2013.01); *G02B 27/30* (2013.01); *G02B 30/24* (2020.01); *G02B 30/25* (2020.01); *G03B 21/006* (2013.01); *G03B 21/2033* (2013.01); *G03B 21/60* (2013.01)

(58) Field of Classification Search
    CPC .... G02B 27/286; G02B 27/30; G03B 21/006; G03B 21/2033; G03B 21/60
    USPC ......................................................... 359/464
    See application file for complete search history.

(56) References Cited

U.S. PATENT DOCUMENTS

| | | |
|---|---|---|
| 10,012,841 B1 | 7/2018 | Frayne et al. |
| 11,009,640 B2 | 5/2021 | Radel et al. |
| 2008/0198459 A1 | 8/2008 | Fergason |
| 2022/0043277 A1 | 2/2022 | Karafin et al. |

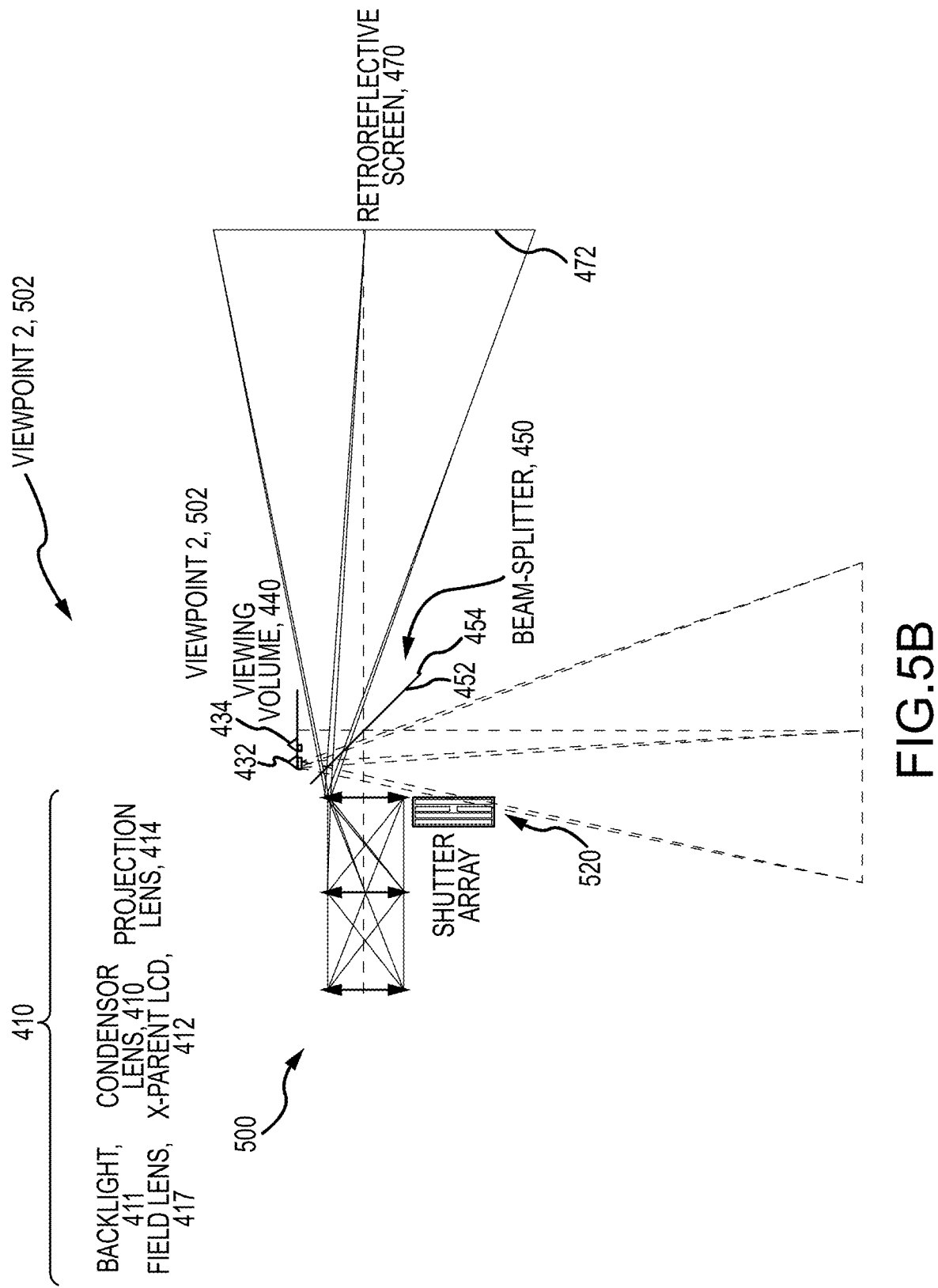

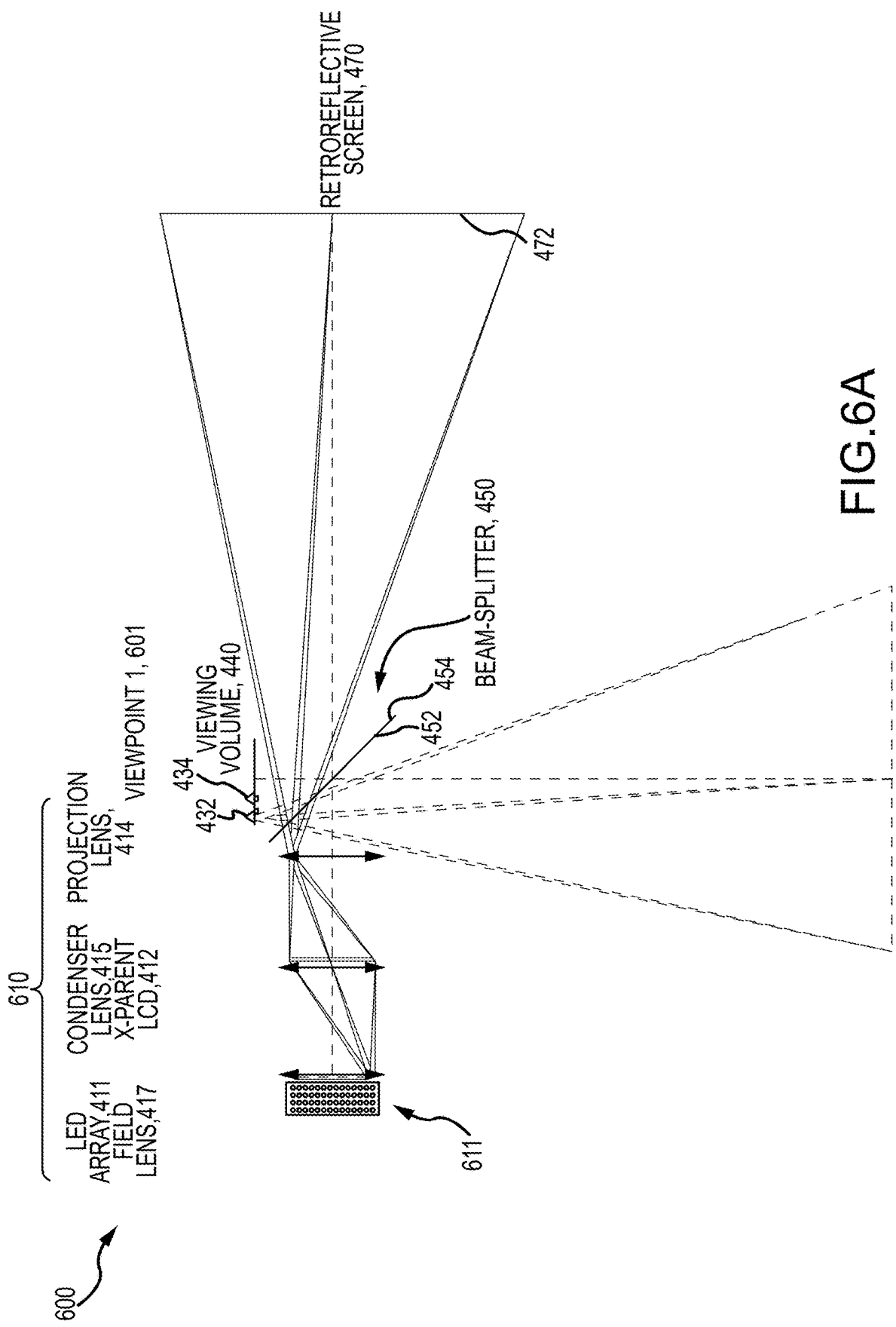

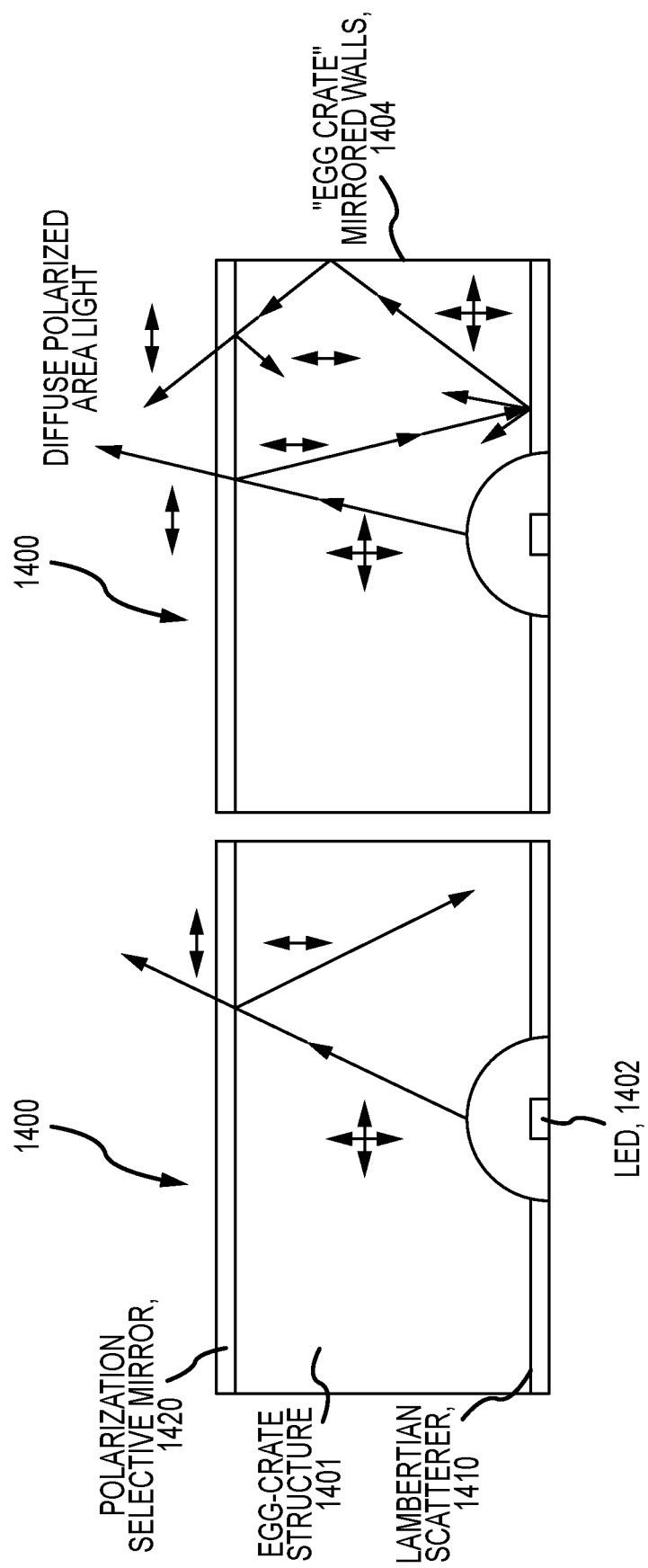

VISUAL EFFECT SYSTEM INCLUDING PERSPECTIVE-CORRECT AUTOSTEREOSCOPIC RETROREFLECTIVE PROJECTION

CROSS-REFERENCE TO RELATED APPLICATION

This application is a continuation of U.S. patent application Ser. No. 16/836,549, filed on Mar. 31, 2020, which is incorporated by reference herein as if set forth in full, and priority to this application is claimed to the full extent allowable under U.S. laws and regulations.

BACKGROUND

1. Field of the Description

The present invention relates, in general, to projecting or displaying video/animated or still three-dimensional (3D) images to augment a physical set or space or provide such as to provide an augmented reality (AR), a virtual reality (VR), or other visual display experience involving 3D images or imagery, and, more particularly, to autostereoscopy and retroreflective projection methods and systems for providing glasses-free 3D to achieve a new visual experience such as an AR or VR experience.

2. Relevant Background

There are numerous entertainment and other settings where it is desirable to create unique visual displays to entertain and excite viewers. For example, theme or amusement parks may include rides or walk-through attractions where guests (or "viewers") are entertained by a unique visual effect or illusion. Often, it is desirable to create a display with three dimensional (3D) images so as to enhance a physical set or environment so as to create an AR experience. Even more desirable for many entertainment facility operators is to provide the 3D display without requiring the viewer to wear special headgear or glasses, e.g., using perspective-correct autostereoscopy or similar techniques.

In recent years, the incorporation of 3D stereoscopic projection and imagery into rides, attractions, and other entertainment experiences has been rapidly increasing. However, many of these attractions require that the rider or participant wear 3D glasses or a head-mounted display (HMD), which causes the ride operator to purchase and provide the glasses and/or headset and also to gather, clean, and replenish the 3D glasses or headset. Additionally, many participants find the glasses and HMDs to be uncomfortable and to be difficult to wear over traditional prescription glasses. The one-size-fits-all models are often ill-fitting requiring ongoing adjustment or repositioning by the wearers especially after rapid or jerky vehicle movements in the ride or after extended wear in another setting. Furthermore, wearing 3D glasses or an HMD actively removes riders or participants from an experience and creates a mediated separation between them and their companions or fellow participants. The donning of a pair of glasses or HMD requires an intentional suspension of disbelief in approaching an entertainment experience, as putting on any such device makes obvious that the device is a tool to create illusion in order to tell a story or develop atmosphere. It is often desirable in an entertainment experience to have participants encounter content and environments without having the previous expectation that they will experience a media-based illusion by virtue of their active preparation to receive such content through being fitted with headgear.

With these problems in mind, operators of entertainment facilities recognize that the use of perspective-correct autostereoscopic projection or 3D without need for glasses in an AR system would greatly enhance the sense of immersion and improve the rider experience as well as reducing problems with providing glasses or headgear. Unfortunately, it has proven difficult to provide perspective-correct autostereoscopic displays for a large number of viewers.

In some projection or display applications such as in theme parks, there is a need to present characters at their natural scale and dimensions especially when these characters are interacting with guests or viewers and the environments in which they are presented as AR objects or images. In some cases, costumed cast members or animatronics were used instead of AR systems, but many of the characters are animated and computer generated (CG) so it is more desirable to present them in the physical world in their original digital form as they appear and act on the movie or display device screen. Costumed characters and animatronic or robotic figures are bound by the laws of physics, which limits their size and mobility and which causes them to not move around or interact with their environments in a way that matches the corresponding CG character. Further, it may be desirable to present visual effects within the 3D environment over physical set pieces and props with the full control and appearance that CG imagery provides. Classical and modern theatric techniques to overlay digital imagery on physical scenes such as Pepper's Ghost and scrim and other projection often only provide a less than desirable two-dimensional (2D) imagery in a single plane or conforming to a surface.

Virtual reality (VR) is capable of presenting 3D CG characters in perceptually large immersive environments. However, the character and VR world exist only in a digital form and cannot appear with or interact with the physical environment. Further, the fully enclosed VR head-mounted display (HMD) greatly isolates the wearer from both the environment and others limiting any shared experience and making VR less desirable for theme park and other settings where it is desirable to create a shared and, in some cases, interactive AR experience or a glasses-free VR or other 3D media experience.

AR is capable of presenting digital visual content overlaid onto the physical environment. AR allows the user or wearer to experience the sensually rich physical environment and personal interactions that are augmented and enriched with digital dimensional characters and effects. Current smartphone and HMD-based AR experiences, however, still separate the user or wearer from the experience by requiring the user to hold or don electronic equipment often with a limited field of view. Further, the cost associated with HMD-based AR experiences can be prohibitive for settings where large numbers of viewers or guests are present such as for theme park attractions.

Also, while heads-up displays with the ability to overlay imagery have existed for many decades, these displays suffer from the need for collimating optics to produce an image that approximates optical infinity in order to allow the user's ocular system to simultaneously accommodate both the projected imagery and the world around them. These optics limit the field of view and/or potential eye locations (eye box) and have other limitations with regard to their ability to push the focus plane toward true optical infinity. This limits their potential in theme park and other applications involving larger physical spaces. Further, while more recently headsets have been developed that optically combine the real world with stereo AR overlays, these suffer from limited field of view and are largely impractical for use in a theme park and similar contexts for operational reasons as well as due to the delicate natures of the devices and their associated purchase and maintenance expenses.

Hence, there remains a need for improved visual display techniques and systems for creating or projecting 3D images to provide an AR experience. Preferably, such new projection or display systems would provide large, wide field-of-view, dimensional (e.g., 3D), and interactive digital content that visually overlays and augments physical sets and environments in a perspective-correct manner without requiring the viewers to wear 3D glasses, HMDs, or use digital mobile devices. Such a display or projection system may be configured to allow unencumbered viewers (e.g., theme park attraction participants) to discover and experience digital content that is augmenting and naturally integrated into the physical environment. Such a system would be even more desirable if it could accommodate real-time rendering of media imagery for each eye of each participant, ensuring a perspective-correct autostereoscopic experience that can respond consistently across the participant's movements and that can offer the presentation of personalized content to each participant. Furthermore, the possibility of having individual participants physically interact with digital media in a spatially-aware manner is particularly desirable. Additional benefits of such an AR system would be to eliminate the need for procurement, maintenance (including cleaning facilities), and replacement costs of expensive and fragile mobile devices, HMDs, and/or 3D glasses. The new gear-free AR system would eliminate the time to inform and prepare each attraction participant or viewer on how to wear, adjust, and use mobile devices or HMDs.

SUMMARY

The present invention addresses the above problems by providing a visual effect system (which may also be labeled and/or include an AR system, a VR system, or a 3D image projection system) that includes components configured and operated to project or form virtual images that are viewable from specified eye boxes that coincide with a system-tracked or determined location of a viewer's left and right eyes. The eye boxes can be positioned in space in a variable and expandable set of locations that collectively constitute a viewing volume. Stated differently, the projected imagery may be considered the virtual images as would be seen in 3D glasses but retroreflected to locations in space to provide a viewer who is not wearing 3D glasses or an HMD perspective-correct 3D stereoscopic imagery. The viewer is positioned (e.g., on a vehicle seat or viewing seat or standing in a prescribed location) in a viewing space, and eye (or face) location sensors have their output processed by the system controller and its software to determine the present location of the viewer's eyes and to interpret that eye box correspondingly.

A projection engine or assembly is then operated to project left and right images of an AR object based on these eye locations, and the viewer perceives the projected AR object with proper dimensions and characteristics for their eye locations while concurrently viewing a physical space, whereby the physical experience is augmented with virtual objects from a proper viewpoint. The content may be rendered in real time (such as with a left and right eye camera in a computer-generated imagery environment or application) or be pre-rendered in some settings and chosen based on the determined/tracked eye (or face) locations. The projection assembly may be solid state or be mechanical to provide the left and right eye images at locations that change over time (during viewing) of the physical space that is being augmented by the AR system. The projector's output light or projected left and right eye imagery is directed through a beamsplitter and onto a reflective screen (e.g., a screen fabricated of retroreflective material), which may be positioned on or near the ceiling of the space above the viewer. The projected light providing the left and right eye images is reflected back onto the surface of the beamsplitter facing or exposed to the viewer in the viewing space, and, from there, the projected light is reflected toward the viewer's left and right eyes within the viewing volume to present virtual images of the AR objects corresponding to each eye, visible within the specified eye boxes in which each of the viewer's eyes are located. This allows the viewer to concurrently perceive the AR objects in the physical space with physical objects and set pieces in the physical space, with the AR objects at a variable distance that can be manipulated with stereoscopic disparity such that the viewer perceives it where desired.

More particularly, a system is provided that is adapted to create a unique autostereoscopic visual effect experience (e.g., an AR experience, a VR experience, or other visual 3D-based experience) without the need for special glasses or headsets. The system includes a projection screen, which may include a reflective surface formed using retroreflective material such that the projection screen may be labeled a retroreflector. The system further includes a projection assembly and a beamsplitter, which is disposed between an outlet of the projection assembly and a reflective surface of the projection screen to permit transmission of light from the projector through a first side and receive light from the projection screen on a second side. The system also includes a physical viewing space adjacent and facing the second side of the beamsplitter. In the system, a controller selectively operates the projector assembly to project left and right eye images toward the light receiving surface of the projection screen. This light is reflected to the second surface of the beamsplitter, and then directed toward the physical viewing space, where it reconverges such that it will be viewable from eye boxes within a specified viewing volume. During these operations, the left and right eye images are rendered in a stereoscopic manner to correspond to specific and variable left eye positions and right eye positions within the specified viewing volume. This allows a viewer with eyes positioned at the left and right eye box positions to perceive a three-dimensional (3D) virtual object in the physical space concurrently with light from physical objects or scenery in the physical space.

In some embodiments, the system includes eye location sensors (e.g., a computer vision assembly) tracking the left and right eye positions, and the left and right eye images are stereo images rendered of a 3D scene for viewpoints matching the tracked left and right eye positions. Further, in such embodiments, the left and right eye images are delivered by projectors. The projected images for each eye are viewable in eye boxes coinciding with the tracked left and right eye positions within a specified viewing volume.

In some cases, the projection assembly includes a left eye projector and a right eye projector projecting the left and right eye images, respectively, and the projection assembly includes a positioning assembly moving the left and right eye projectors to modify the left and right eye box locations to match the left and right eye positions. This embodiment might also include a variable distance mechanism to allow the left and right eye projectors to adjust their separation from each other in accordance with a sensed understanding of the participant's unique inter-pupillary distance measurement. In other (i.e., solid-state embodiments) implementations, the projection assembly includes a projector adapted to project the left and right eye images using a specialized Kölller illumination array and imaging elements. In other implementations, the projection assembly includes a shutter array operable to switch between an appropriate left eye shutter and an appropriate right eye shutter to emit the left and right eye images, respectively, in a time multiplexed manner during tracking of the left and right eye positions to provide stereo imagery, and the specific left and right eye shutters vary with changes in the left and right eye positions.

In other cases using Köhler illumination or a shutter array, though, the projection assembly includes a light emitting diode (LED) array as a light source, and the LED array is operable to switch among individual LEDs of the LED array to emit the left and right eye images in a time multiplexed manner based on tracking of the left and right eye positions to alternate between providing a left eye viewpoint at the left eye position and a right eye viewpoint at the right eye position. In some system designs, the projection assembly includes a projection lens and/or a concave mirror. In some subsets of these system designs, a polarization-selective beamsplitter is disposed between the concave mirror and the LED array, and a quarter-wave film is disposed between the concave mirror and the beamsplitter. In yet other variants of these system designs, off-axis concave mirrors could be used without a beamsplitter. Still other embodiments may employ a large conventional projection lens, a large lens array, or a Fresnel lens, any of which could replace the utilization of a concave mirror. In these or other system designs, the reflective surface of the projection screen is a retroreflector, and the system further includes a one-dimensional (1D) diffuser disposed between the reflective surface and the beamsplitter. It may be useful in some embodiments to include a transparent display element (e.g., a transparent LCD or the like) in the physical space operated to display a mask providing light occlusion in the physical space for the 3D virtual object.

There are numerous use or field-installation cases for the new visual effect system. For example, the projection screen, the beamsplitter, and the projection assembly can be mounted upon a vehicle body (such as for use in a theme park ride or attraction) or upon a display structure (such as for a standalone kiosk or the like). In other examples, the projection screen is mounted on a ceiling or surface defining the physical space, and the projection assembly is mounted adjacent the physical space to emit light onto the reflective surface of the projection screen. In still other examples, the system includes a vehicle supporting the viewer, and the projection assembly is mounted on the vehicle or adjacent the physical space. In these embodiments, the projection screen and beam splitter may be positioned in or adjacent to the physical space.

In some embodiments of the visual effects system, it may be desirable to make the projector or projector assembly as compact as practical while retaining or improving upon optic qualities (such as brightness) of the achieved 3D imagery. In these embodiments, the projection assembly may be designed and/or built to include: (a) a polarization selective beamsplitter disposed at a 45-degree angle between the LED array and the reflective surface of the projection screen; (b) a transparent LCD with a backing film comprising a polarization-preserving retroreflector; (c) a projection mirror arranged with the polarization selective beamsplitter disposed between the transparent LCD and the projection mirror with the backing film on a side of the transparent LCD opposite the projection mirror; and (d) a quarter-wave film or plate disposed between the projection mirror and the polarization selective beamsplitter. In such an implementation, the retroreflector providing the reflective surface of the projection screen may or may not take the form of a polarization-preserving retroreflective screen, and the main beamsplitter may or may not be a polarization selective mirror. Then, the visual effect system may further include a polarization wave plate disposed between the beamsplitter and reflective surface of the projection screen.

In other implementations of these embodiments, the projection assembly may instead include: (a) a polarization selective beamsplitter with a first side at a 45-degree angle to the reflective surface of the projection screen and with the first side facing the LED array; (b) a transparent LCD facing a second side of the polarization selective beamsplitter and having a backing film comprising a polarization-preserving retroreflector opposite the LED array; (c) a projection mirror made up of a curved half mirror with a concave side facing the transparent LCD and with a convex side facing the LED array; (d) a quarter-wave film or plate disposed between the projection mirror and the polarization selective beamsplitter; and (e) a circular polarizer disposed between the LED array and the convex side of the projection mirror.

In these or other embodiments, a polarized light-efficient LED array may be provided in the projection assembly. This would allow light from the LED array to match the polarity of the light required to pass through the LCD screen component, which would have the effect of increasing the light efficiency of the system. This technique may involve the addition of a brightness-enhancing film (such as the commercial 3M product "Dual Brightness Enhancing Film II") that allows light transmission of one polarization of light from the LEDs in the LED array, while reflecting light of other polarizations. In this system (as shown in more detail in FIGS. 14A and 14B), a Lambertian scatterer may be included to redirect and randomly polarize any light that has not previously passed through the brightness-enhancing film so that more and more of the light can achieve an orientation that could be transmitted through the film. This would be achievable with the inclusion of a custom LED surround structural array that serves as the Lambertian scatterer, in the form of an extruded grid. This structural array functions to retain light within a desired region, in order to be able to potentially achieve the proper polarization orientation for brightness-enhancing film transmission. This increases the efficiency of the polarized LED light being emitted as compared to other systems, and such features have likely useful application as an additional component to any LED array-based embodiment described herein.

In still other implementations, the system may be configured to utilize replication optics to generate a projection array in order to better optimize the system. An exemplary projector assembly utilizing various replication optics along with several embodiments of replication optics assemblies are shown in FIGS. 15A-15N described in detail below.

BRIEF DESCRIPTION OF THE DRAWINGS

FIGS. 5A-5B illustrate a visual effect system similar to that shown in FIG. 4 using a shutter array to provide stereo images to tracked eye locations of a viewer with a single projector;

FIGS. 6A-6B illustrate another embodiment of a visual effect system similar to that shown in FIG. 4 with multiplexing of stereo images at tracked left and right eye positions provided using an LED array as the light source or backlight element;

FIGS. 14A and 14B are schematic illustrations, which show two steps or aspects of operations, of one useful implementation of polarization light recycling that may be utilized in a projector or projection system of the present description.

DETAILED DESCRIPTION

Figure 1:
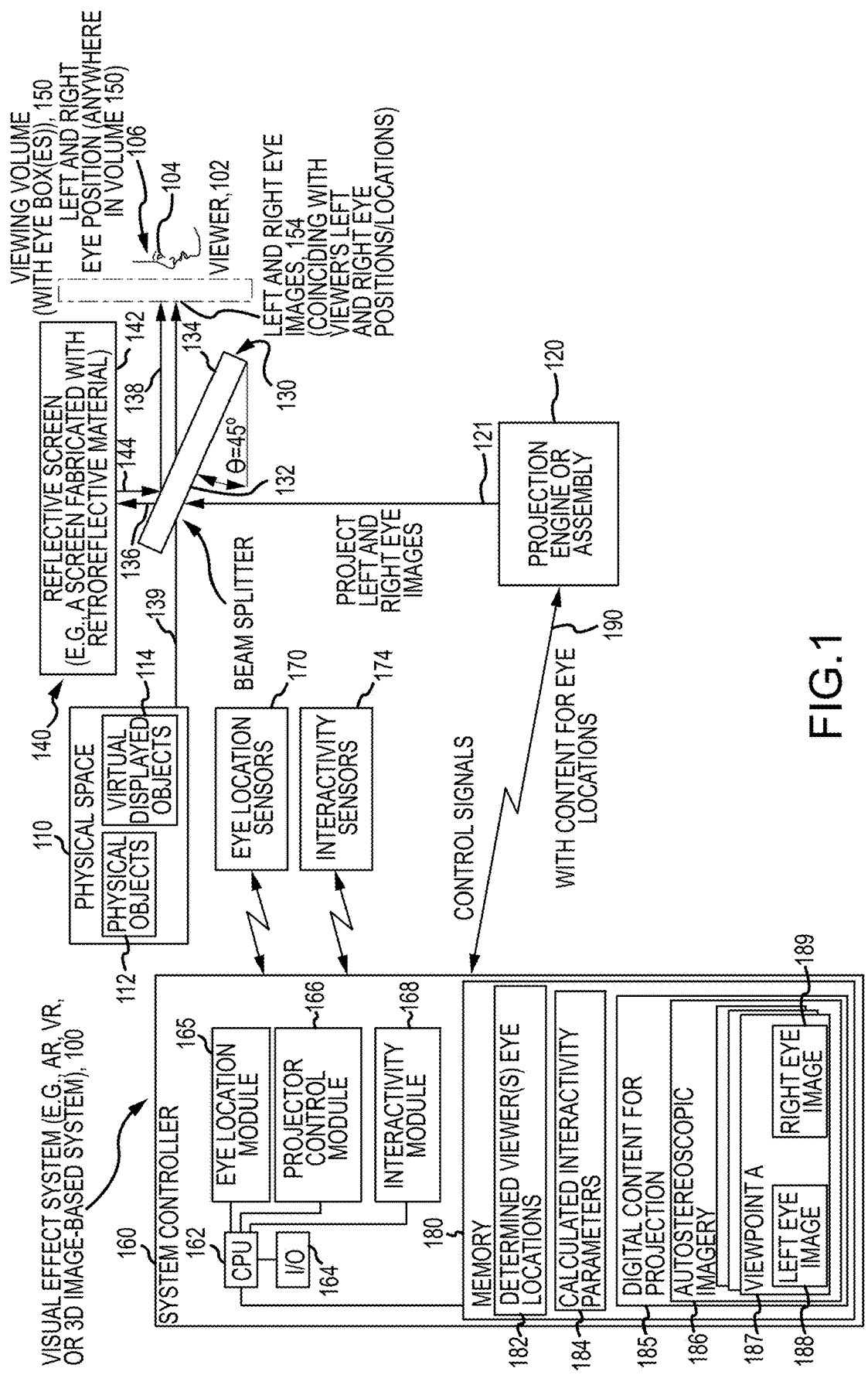
FIG. 1 is a functional block drawing of a visual effect system (here labeled an AR system as one useful, but not limiting, exemplary implementation) configured to use autostereoscopic retroreflective projection of the present description.

Embodiments described herein are directed toward a visual effect system, which may be implemented as an AR system, a VR system, or other 3D image-based visual imagery system, that uses autostereoscopic retroreflective projection to display left and right images at tracked and/or determined left and right eye locations, respectively, of a viewer.

The visual effect system may be used in a wide variety of settings and is particularly well suited for use to enhance theme park experiences, including both walk-up experiences and those involving a ride vehicle. By solving problems associated with prior AR devices for the particular case of theme park experiences rather than the general problem of heads-up displays in all settings, the inventors were able to develop a specific infrastructure that may be less practical in other settings but that produces a display with an extremely wide field of view (fov) capable of presenting autostereoscopic imagery at a comfortable focal plane. In the visual effect system, an image combiner or beamsplitter (with these terms being used interchangeably herein) is positioned in front of the viewer.

For example, a ride vehicle for a theme park ride may be outfitted with a windshield that acts as the image combiner, e.g., the windshield is placed at a 45-degree angle such that it reflects the ceiling back to the viewer(s) (or reflects light from a reflective screen placed on the ceiling back to the viewer) from a surface facing the viewer(s) in the vehicle. The ceiling of the facility in which the vehicle is traveling may be sufficiently high so as to place the imagery at optometric infinity (generally accepted to be about 20 feet) or anywhere closer to approximate the focal plane of the physical scene being presented or augmented for the viewer. This is useful for eliminating the need for collimating or infinity optics. In one useful embodiment, the ceiling above the vehicle (or present location of the vehicle in front of the physical space or set/scene) is blanketed with an extremely high-gain projection or reflective surface/screen (e.g., with a screen formed of high-precision retroreflective material) such that any imagery projected onto this surface cannot be seen unless the viewer's eye-point is tightly optically registered (e.g., within about a quarter inch) with the projection source. This allows stereo imagery to be directed into each individual eyeball of the viewer by way of individual projection sources.

The projection sources in this exemplary vehicle-based embodiment are located beneath the image combining windshield (onboard or offboard the vehicle) with their output light focused on a ceiling-mounted retroreflector or on a retroreflector in an alternative position with the addition of a mirror (e.g., a ceiling-mounted mirror) to redirect the light to the alternatively positioned retroreflective screen. With the addition of high-speed face/eye tracking, the projection source can be adjusted using a variety of techniques (e.g., projector arrays, moving optics, solid state projection engines, and the like) to display or project the images associated with AR objects at tracked or determined locations of a viewer's eyes in the vehicle. Additionally, the media (or digital content) may be rendered in real time such that the viewpoint and, optionally, the content is unique for each viewer and accurate to their perspective, which allows the AR system to present imagery that aligns precisely with physical scenic elements. Further, the AR system may be adapted to provide imagery that is more comfortably accommodated by a closer focal plane by varying the distance to the retroreflector, as retroreflective material is commonly available as a flexible film that can be contoured. In the case of a moving vehicle that follows a path from scene to scene, this would allow a variable throw distance (albeit one that is defined per vehicle location).

A variety of other arrangements of the optical system may be used in other exemplary embodiments of the visual effect system. For example, instead of being located offboard and on a facility or space ceiling, an onboard retroreflective projection screen may be used such as by placing the retroreflective material upon an interior surface of the vehicle such as a vehicle roof or the like above and a small distance forward of the viewer's seats. This may be very useful in settings with larger and/or taller ride vehicles. Additionally, should physical vehicle or environment constraints prevent a ceiling retroreflective projection screen mount location, adding one or more mirrors into the system could allow for a retroreflective screen position on the back wall of the vehicle or in another location within the system's environment. In some AR or other visual effect systems, the image combiner may be offboard and not provided as a vehicle windshield. For example, a large scale beamsplitter may be positioned adjacent a physical space or set that is to be augmented, and a ride vehicle may "dock" with the stationary beamsplitter just prior to display by the projection engine/source of the left and right images to provide the stereoscopic image to a viewer so as to provide more selective use of the AR system in a theme park attraction.

FIG. 1 illustrates, in functional block form, a visual effect system 100 implementing autostereoscopic retroreflective projection as discussed above to provide a viewer 102 (such as a rider of a theme park ride vehicle, a participant in an attraction, or the like) an AR, VR, or other 3D image-based experience without the need for 3D glasses or an HMD. The viewer 102 is in a viewing space, such as along a ride path in a vehicle, and has their eyes 104 at left and right eye positions 106 that may vary over time and that coincide (or are located in) a viewing volume, that constitutes the collective possible location of or one or more eye boxes 150 of the AR system 100. Particularly, the system 100 is adapted for generating left and right eye images 154 at the tracked/determined eye positions 106 with light 138, and this creates perceivable virtual displayed objects 114 that appear to be in a physical space 110 according to the stereo disparity of the left and right eye media generated for the experience (i.e., the perceived object distance can be variably in front of or behind the image combiner, based on design intent). The virtual or AR objects 114 are observed by the viewer 102 concurrently with light 139 from the space 110 such as from light reflecting off or emitted from surfaces of physical objects or set elements 112 such that the space 110 and/or objects 112 are augmented by the virtual or AR objects 114.

The display device or projection portion of the system 100 includes a projection engine or assembly 120 that operates in response to control signals 190 from a system controller 160 to output or project light 121 providing left and right eye images (which may be provided concurrently or in a time multiplexed or switching manner depending on the projection assembly 120 design). The projection engine 120 may be positioned and/or focused to direct the output light 121 through (e.g., upward in some cases) a beamsplitter 130, first striking lower or inner surface 132 and passing through upper or outer surface 134 as light 136 (e.g., with a reduced brightness due to losses in the beamsplitter 130). The beamsplitter 130 may be arranged at an angle, θ, relative to horizontal to direct and/or reflect light to the viewer 102 in a desired manner such as at a 45-degree offset angle, θ. The beamsplitter 130 is positioned between the viewer 102 (and the viewing space in which the viewer 102 is located) and the physical space 110 and its physical objects/set elements 112.

Significantly, the light 136 having passed through the beamsplitter upper or outer surface 134 is projected upon a surface 142 of a reflective screen 140 facing the outlet of the projection assembly 120 (i.e., the beamsplitter 130 is disposed between the projection assembly 120 and the reflective screen 140). As a result, light 144 (providing the left and right eye imagery) is reflected back toward the beamsplitter 130 where a portion is reflected as light 138 off of the upper/outer surface 134 toward the viewer 102 in the viewing space (e.g., into a ride vehicle). The reflective screen 140 is configured and arranged (e.g., orthogonal to the projected light 121 from the projection assembly 120) so that left and right eye images 154 are viewable respectively at the left and right eye positions 106 of the viewer's eyes 104 (and within the viewing volume 150). To this end, the surface 142 may be formed using one or more retroreflectors or screens formed of retroreflective material, which reflects the light 144 back toward to the outlet(s) of the source or projection engine 120.

The system 100 includes a system controller 160 configured to generate a set of control signals to operate the projection engine or assembly 120 to generate the output light 121. The signals 190 may include positioning controls to move projectors or change focuses in a mechanical-based assembly 120 to focus one or more projectors on tracked or determined left and right eye locations 106 of a viewer 102 or may direct operational controls on which portions of a solid state-type projector assembly 120 should operate to provide the light 121 to focus on the eye positions 106. Also, the control signals 190 are shown to include the digital content (frames of still or video images of an AR object(s)) selected or generated in real time to suit the tracked or determined eye locations 106.

To these ends, the system controller 160 is shown to include a processor(s) 162 that manages operations of one or more input and/or output devices 164. The I/O devices 164 may include interfaces to allow a human operator to input data such as keyboards, touchpads or screens, voice recognition devices, and the like and to view data such as monitors to allow the operator to direct operations of the system 100 (e.g., to select which AR objects 114 to generate, to initiate a particular interactivity script, and so on). The processor(s) 162 may include a graphics processor (or GPU) to facilitate real time rendering of CG content 185 to include in control signals with rendering software run by the processor 162 (not shown in FIG. 1 but well understood by those skilled in the animation fields). The processor 162 also manages data retrieval from and storage into memory or data storage 180.

Further, the processor 162 runs or executes code or software in local memory to provide the functions associated with an eye location module 165. The module 165 is used to process data gathered by eye location sensors 170 to determine the present left and right eye positions 106 for the viewer 102, which are stored at 182 in memory 180. The eye location sensors 170 may include one or more video cameras for capturing images of the viewer 102 in the viewing space, and these images may be processed by the module 165 to determine eye locations 182. In one embodiment, the viewer's eyes 104 are identified and their locations determined while other embodiments may utilize face detection and tracking (such as using the KLT algorithm or the like) to determine the eye locations 182.

With the eye locations 182 as input, the projector control module 185 can choose from previously rendered imagery or real time render (or cause to be rendered) digital content for projection 185 (and transmittal to the projection engine 120). For example, the control module 166 can cause autostereoscopic imagery 186 to be generated of a particular virtual scene from the viewer's determined viewpoint (or eye locations 182) by placing virtual right and left eye cameras in a CG scene at locations matching or chosen for eye locations 182 to generate for a first viewpoint 187 a left eye image 188 and a right eye image 189. These images 188 and 189 may be still or video images (e.g., multiple frames), and the projection engine 120 acts to project these in light 121 so as to focus the left eye image 188 on the viewer's left eye position 106 and the right eye image 189 on the viewer's right eye position 106 in the viewing volume 150 as left and right eye images 154.

In some implementations, the system 100 is further adapted to provide interactivity between the viewer 102 and the physical space 110. This may be achieved by choosing or modifying the AR or virtual objects 114 used to augment the physical objects 112 during a viewing or interaction session. To this end, the system 100 may include one or more interactivity sensors 174 collecting data pertaining to the viewer 102 such as location and/or movement of their body or portions of their body such as their hands, such as interaction with a handheld device and/or with components of a ride vehicle, and so on. In some cases, the sensors 174 include one or more video cameras capturing images of the viewer 102 and/or nearly any digital or analog interface devices that capture specific information from the viewer 102 to assist the interactivity module 168 and/or the projector control module 166 in providing feedback to the viewer 102 about or with the information that is gathered by the interactivity sensors 174. The controller 160 may run or execute code to provide the functions of an interactivity module 168 to process the output of interactivity sensors 174 and generate or calculate a set of interactivity parameters 184 (e.g., tracked movement of the viewer's hand or the like). Additionally, the result of the interactivity module output may include audio cues, practical lighting cues, auxiliary projection in the physical scene, actuated physical scene elements/props, and/or other practical special effects. These may all be triggered in response to the movements of the viewer 102 or other sensed interactivity (as through another interaction input device). The projector control module 166 may process the interactivity parameters 184 to modify the autostereoscopic imagery 186 or to select different imagery 186 (e.g., different objects 114) based on the calculated interactivity parameters 184 so as to provide the viewer with an interactive AR experience during operations of the system 100.

As discussed with regard to FIG. 1, the projection engine or assembly 120 may take a variety of forms to implement the visual effect system 100. With this in mind, it may now be useful to describe several embodiments designed by the inventors with the understanding that once these are understood those skilled in the arts will be able to expand upon and modify these to provide the left and right eye images 154 to a viewer 102.

Figure 2A:
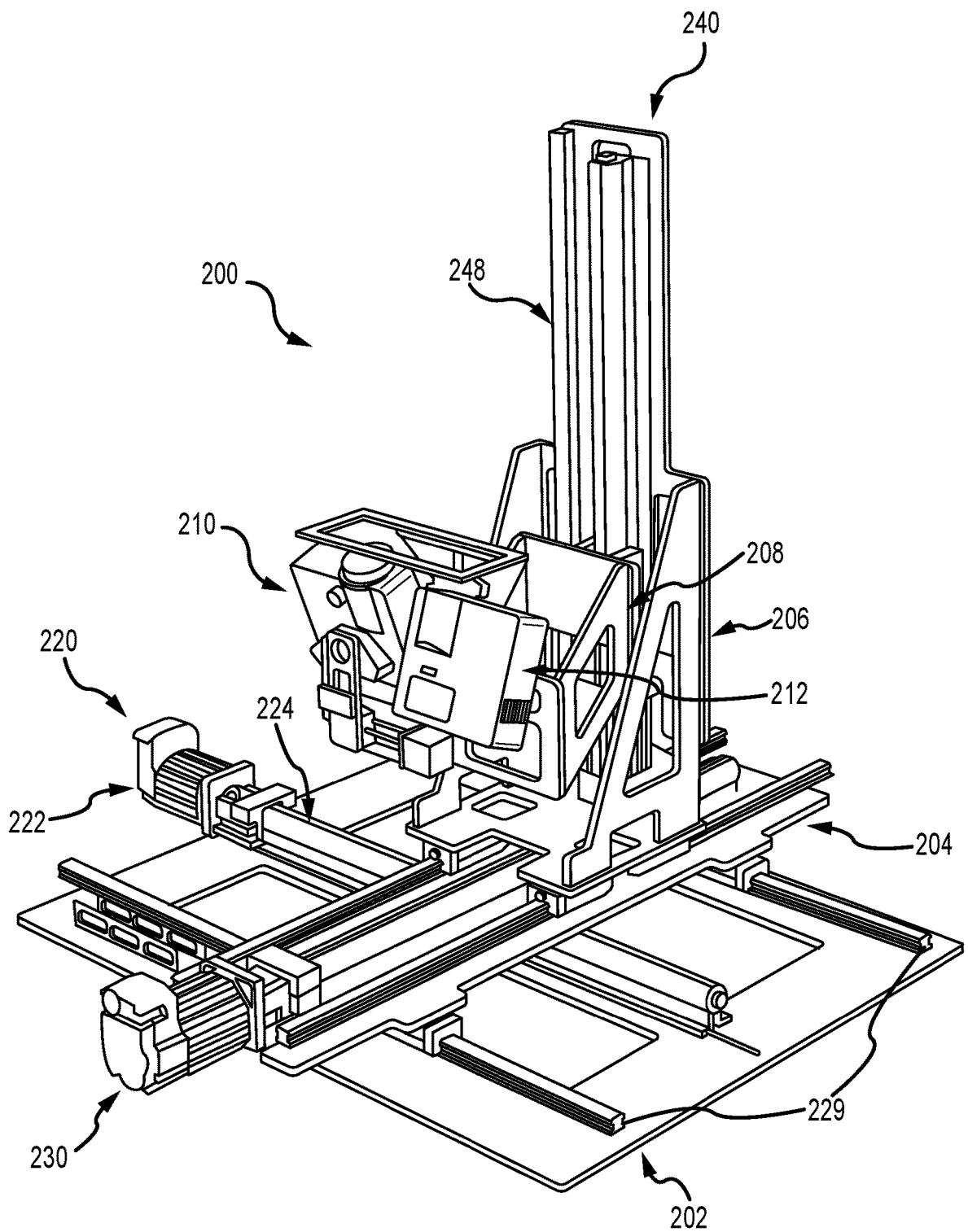
FIGS. 2A-2C illustrate a top perspective view, a top view, and a side view, respectfully, of a mechanical-based projection engine of the present description that may be used in the system of FIG. 1.
Figure 2B:
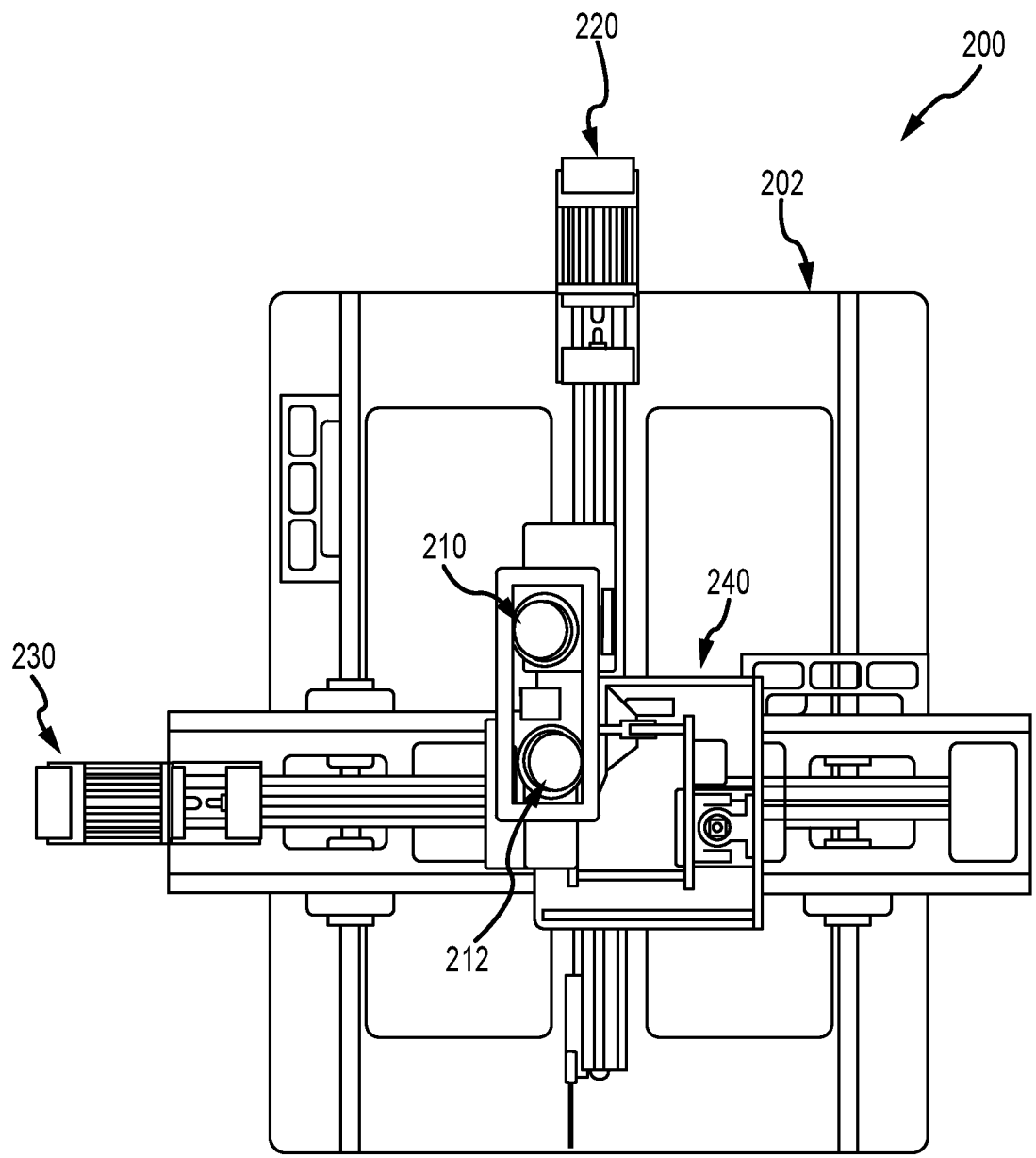
Figure 2C:
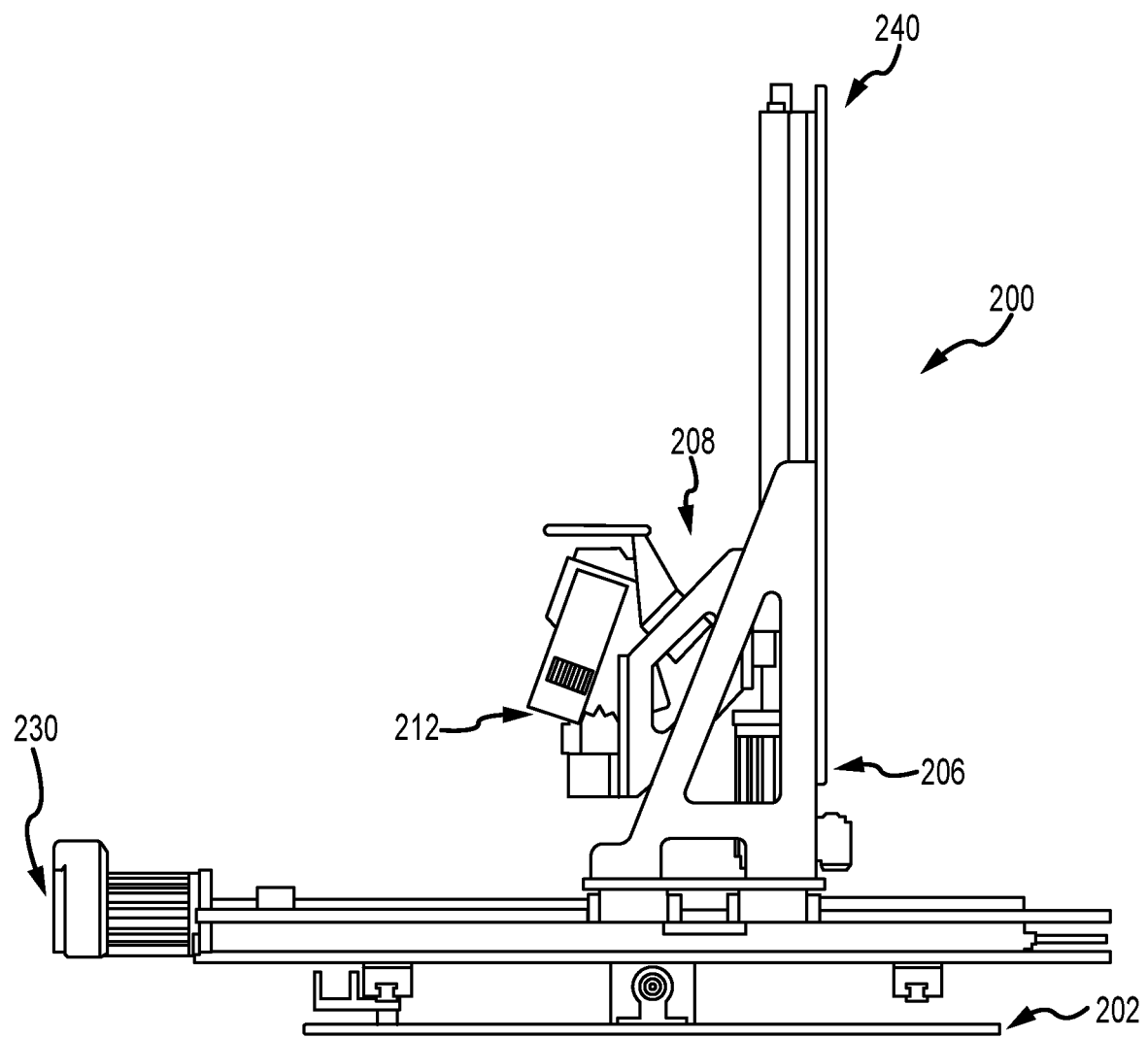

In some cases, it may be useful to implement a projection assembly or source using a mechanical-based design. As one useful example, FIGS. 2A-2C illustrate a top perspective view, a top view, and a side view, respectfully, of a mechanical-based projection assembly 200 of the present description that may be used in the visual effect system 100 of FIG. 1. In one use case, the projection assembly 200 is positioned adjacent a physical set or AR, VR, or 3D-imagery space along a vehicle ride path, and a vehicle is caused to be stationed or docked next to the projection assembly 200 to align it with a vehicle seat and any passenger (or "viewer") positioned on that seat. In another use case, the projection assembly 200 is mounted on the vehicle body itself (e.g., in front and below the windshield or beamsplitter on the vehicle) so when the vehicle is moved on the ride path to the physical set or AR, VR, or 3D-imagery space the projection assembly 200 is aligned with an overhead retroreflective screen and a beamsplitter (both or either on or offboard the vehicle carrying the projection assembly 200). In still another use case, the entire system 200 remains stationary in a walk-up experience.

As shown, the projection assembly 200 includes a base plate 202 for mounting the assembly 200 onto a vehicle or near a physical space (as discussed in the prior paragraph). The projection assembly 200 includes first and second projectors 210 and 212 that are operated to provide right and left eye content as discussed with reference to FIG. 1, with the first projector 210 being positioned and focused to provide right eye content and the second projector 212 being positioned and focused to provide left eye content. The projectors 210 and 212, in practice, would project light through a beamsplitter and focus that light onto a retroreflective screen in order to provide right and left eye images at locations of a viewer's right and left eyes. The projectors 210 and 212 are mounted onto a projector support frame 208 to be moved as a unit, together, or otherwise in the projection assembly 200. The projectors 210 and 212 may take a variety of forms to practice the assembly 200 but generally are chosen to be high brightness projectors to address losses through the beamsplitter, and, in one embodiment, the projectors 210 and 212 were short throw projectors such as the Optoma ML750ST WXGA Short Throw LED projector or the like.

The projection assembly 200 is adapted to be operated in response to control signals from a system controller, e.g., controller 160 of FIG. 1, that may include a motion controller (e.g., a Galil motion controller DMC-4143 BOX.MO was used in one prototype). Particularly, the projection assembly 200 is configured to provide precise and rapid movement of the projectors 210, 212 in the X, Y, and Z directions so as to direct the output of the projectors to the tracked and often moving or changing viewer eye locations. Particularly, X-direction movement is used to track side-to-side movement of a viewer (or to move the eye boxes to the left or right from default upon initial detection of a viewer face position), Y-direction movement is used to track up and down movement of viewer (or to move the eye boxes up or down from default upon initial detection of a viewer face position), and Z-direction movement is used to track in and out movement of viewer (or to move the eye boxes nearer and farther from default upon initial detection of a viewer face position). The system controller generates control signals as the viewer's eye locations are tracked to provide these X, Y, and Z movements and initially provide and maintain proper directing of the outputs of the projectors 210 and 212.

To this end, the assembly 200 includes an X-axis motion assembly 220, a Y-axis motion assembly 230, and a Z-axis (or vertical axis) motion assembly 240. Each of these assemblies 220, 230, 240 are configured to provide linear motion of the projectors 210, 212 in a precisely controlled and rapid manner. Each assembly 220, 230, 240 includes a servo system 222 (e.g., a Teknic Clear Path® Integrated Servo System CPM-SDSK-2310S-RQN or the like) and a linear actuator 224 (e.g., a Bishop-Wisecarver Slickstick™ Linear Actuator [with 18-inch travel, a 1-inch lead screw pitch, and home and limit sensors]) as shown for assembly 220 (with the axes of the linear actuators being arranged to provide X-Y-Z motions for assemblies 220, 230, and 240, respectively) as well as a linear rail and carriage bearing block 248 as shown for assembly 240.

To move the projectors 210, 212 as a unit or otherwise in the X, Y, and Z directions for precise placement relative to a viewer's face position, the projector support frame 208 is supported in or by the Z-axis (or vertical direction) motion assembly 240 to be moved vertically up and down through operations of the Z-axis motion assembly 240. The Z-axis motion assembly 240 is in turn supported on frame or support element 206, which is supported on or in the Y-axis motion assembly 230 so that it moves along the Y-axis through operations of the Y-axis motion assembly 230. Further, the Y-axis motion assembly 230 is slidingly supported on linear rails 229 (which are affixed to base plate 202) and coupled to the X-axis motion assembly 220 so as to be moved along the rails 229 with X-axis movements through or during operations of the X-axis motion assembly 220.

In other cases or implementations, it may be useful to implement a projection assembly or source using a solid-state design (or without use of mechanical components for repositioning projectors). As one useful example, the inventors determined that Kohler-type illumination and projection may be used with unique modifications to provide solid-state autostereoscopic retroreflective projection for AR systems and/or other applications.

Figure 3:
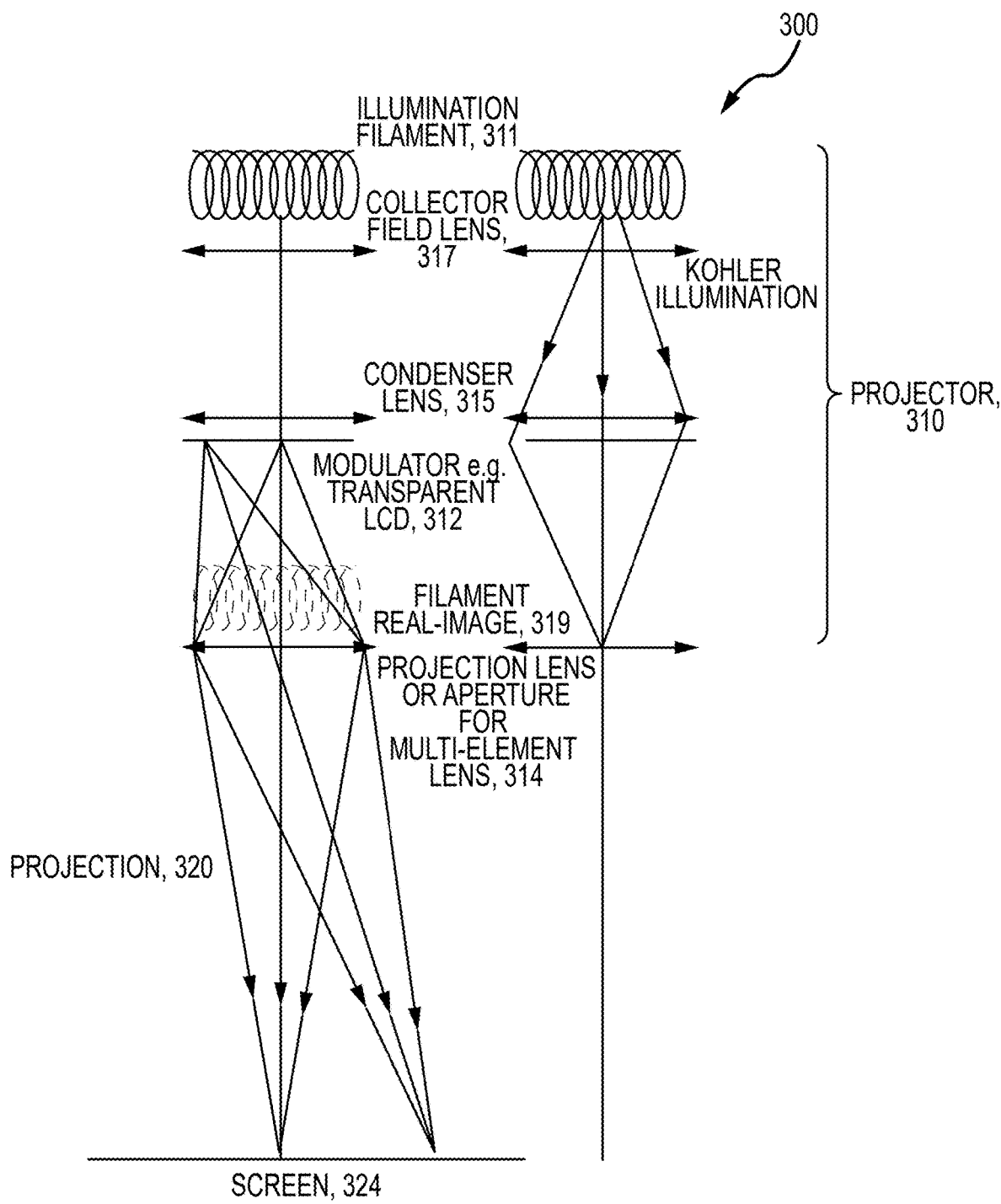
FIG. 3 is a schematic illustration of a projection system or engine using Köhler illumination and projection in a conventional manner.

FIG. 3 is a schematic illustration of a projection system 300 using Köhler illumination and projection in a conventional manner. As shown, the system 300 includes a projector 310 adapted to use Köhler illumination to achieve Köhler projection 320 onto a screen 324. The projector 310 includes a light source (e.g., an illumination filament(s) 311, a light modulator (e.g., a transparent LCD, DMD or the like) 312, and a projection lens (or aperture for multi-element lens) 314. To achieve or use Köhler illumination, additional optics are used to ensure an evenly illuminated modulator and image field, without the structure of the light source (filament) 311 being imprinted on the image. In this regard, the projector 310 includes a collector field lens 317 near the light source (e.g., a xenon filament) 311 and an additional condenser lens 315 located at or near the light modulator 312 that focuses the finite-sized light source 311 onto the projection lens 314 to provide an image 319 of the filament 311. On the way to being focused, light from each point on the illumination source 311 passes through every pixel of the modulator 312 to pick up the image and then reimage it back to a point on the projection lens 314. Each point contains an entire view of the modulator 312, all with the same and full image. The projection lens 314 is configured to focus the enlarged modulator image onto the projection screen 324 a far distance away in this conventional Köhler-based projection system 300.

To create a large 3D image without the need for wearing 3D glasses, the inventors determined it would be useful to combine retroreflective projection with a custom projector or projection engine (as may be used for assembly 120 in FIG. 1), which may build upon Köhler illumination techniques and that is adapted to provide controllable viewpoint illumination. Specifically, the system 300 of FIG. 3 is modified to achieve the new solid-state projection engines/assemblies (or projectors) described in the following autostereoscopic AR, VR, or 3D-image based systems, which are each configured to provide multiple independent controllable viewpoint imagery to the viewer not provided in system 300.

Figure 4:
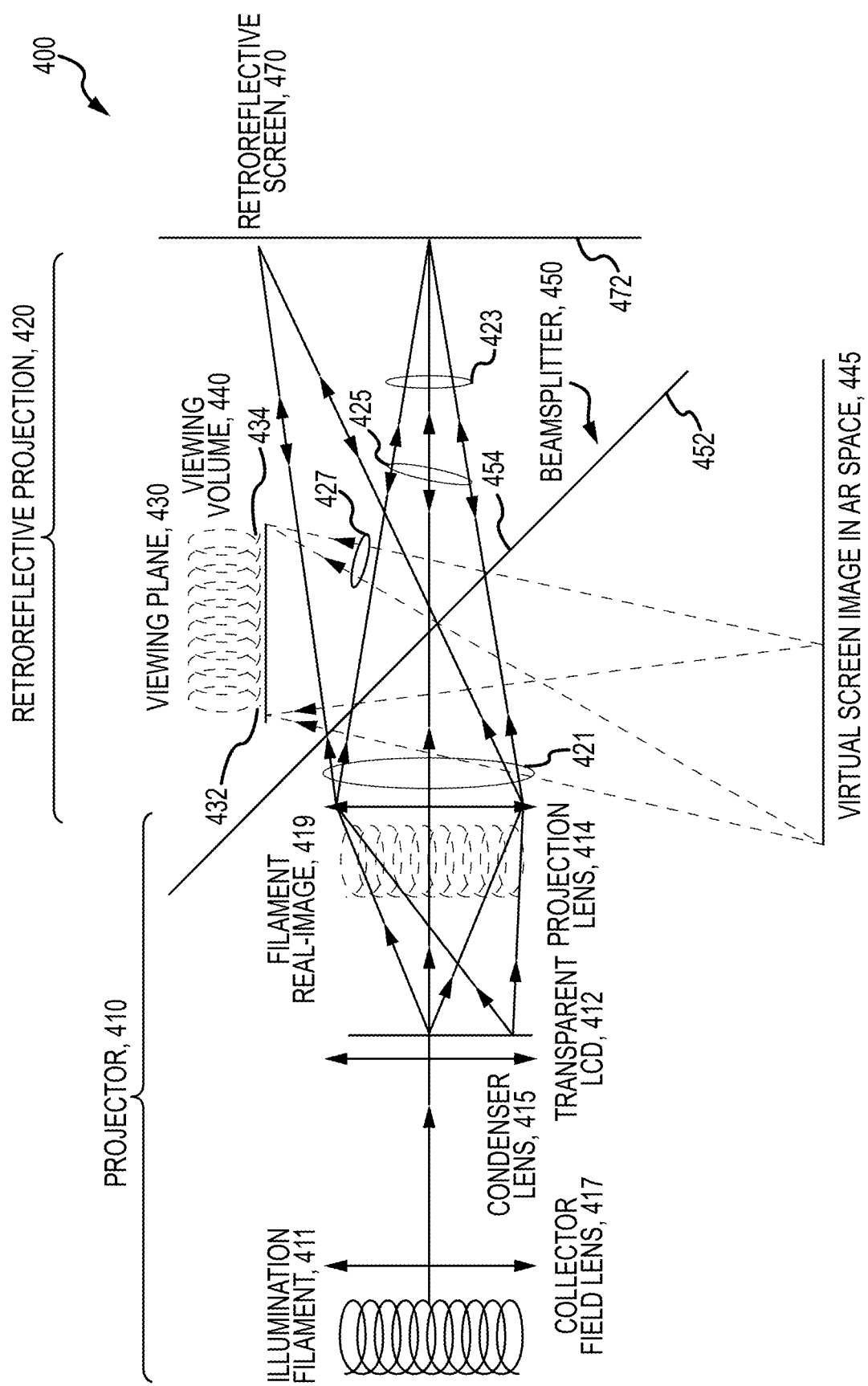
FIG. 4 illustrates schematically a visual effect system of the present description using retroreflective high gain projection in combination with a Köhler illumination projector.

FIG. 4 illustrates a visual effect system 400 (e.g., an AR, VR, or 3D image-based system) with a Köhler illumination projector 410 combined with components useful for achieving retroreflective projection 420. As discussed above, the projector 410 includes a light source 411 such as an illumination filament, a modulator 412 such as a transparent LCD, DMD, or the like, and a projection lens 414. A collector field lens 417 is provided near the light source 411 and a condenser lens 415 is provided near and upstream of the modulator 412 to provide an image of the filament/light source 419 on the projection lens 414 (or to provide Köhler illumination).

In contrast to the system 300 of FIG. 3, the system 400 is adapted to project the output light 421 of the Köhler projector 410 using retroreflective projection 420. To this end, the system 400 includes a retroreflective screen 470 with a reflective surface 472 formed with retroreflective material facing or opposite the outlet of the projector 410 (or upon which the projection lens 414 focuses). Further, a beamsplitter 450 is disposed between the projection lens 414 and the projection screen 470 such as at a 45-degree offset from the plane of the reflective surface 472 or otherwise. The screen 470 may be positioned above, to the side (as shown in FIG. 4), or below the projector 410.

In a viewing space, a viewer positions their left and right eyes 432, 434 in a viewing plane 430, and the projection 420 is performed such that a viewing volume 440 coincides with this viewing plane 430 and tracked locations of the eyes 432, 434 (as discussed above with relation to FIG. 1). This causes the viewer to perceive a virtual screen image 445 in a physical space or AR space through the beamsplitter 450.

During operations of the projector 410, images/output light 421 are projected through the beamsplitter 450 (first striking and being transmitted through an inner or lower surface 452 and then being transmitted from an outer or upper surface 454) as shown with arrows 423 and focused onto the reflective surface 472 of the retroreflective screen 470. The light 425 retroreflected off the screen 470 wants to retrace its path back to the projection source 410, but it is reflected and diverted as shown with arrows 427 by the outer/upper surface 454 of the beamsplitter 450. This light 427 forms a "floating" image within the viewing volume 440 of the aperture of the projection lens 414.

A viewer's eye 432 or 434 located in viewing boxes in positions in the viewing volume 440 of the projection lens aperture [with the viewing plane 430 coinciding or nearly so (such as within 1 inch and more preferably within 0.25 inches) with the viewing volume] sees a large, bright, and virtual image behind the beamsplitter 450 of the projected image overlaid on the real world, as shown in FIG. 4 with virtual screen image 445. At other viewing locations outside the retroreflected image (or eye boxes) in viewing volume 440 of the projection lens aperture, an eye 432 or 434 does not receive any light from the projector 410 and, therefore, the viewer does not see any image in that eye 432 or 434 or at any other viewing location. Further, other viewer's similarly do not receive any light nor see a projected image when their eyes are not positioned in the viewing volume 440.

The reflective surface 472 may also, in some embodiments, be achieved using concave mirrors or lenses to relay a light source 411 of a projector 410 (which may be an array of LEDs or be a filament) to an image in the viewing volume 440. In such embodiments, it may be desirable that the concave mirrors or lenses only be used on-axis or near on-axis viewpoint to avoid (or reduce) aberrations and image distortions, which may reduce the eye box size and the allowable head motion of the viewer during an AR experience. This is one reason that use of retroreflective material on surface 472 is desirable as a retroreflector screen is generally translation invariant and produces a 1:1 image of the projection lens aperture 414 with minimal distortion. In other embodiments, though, a dihedral mirror array may be used to provide the projection 410 acting as both the beamsplitter 450 and the retroreflector screen 470. This may be useful to provide a compact assembly by removing the need for the separate retroreflective screen and beamsplitter configuration shown in FIG. 4.

It was recognized by the inventors that the 3D stereo or multiview imagery projected as images to the viewer's left and right eye positions may be produced using multiple projectors, with one projector for each different viewpoint or motorized to move to the desired viewpoint (such as shown in FIGS. 2A-2C). In the solid-state designs, though, it may be useful to use a single projector customized or controlled/operated to provide temporally multiplexed stereo pair images and, significantly, direct light (and associated imagery) only to the appropriate eye. As discussed with reference to the AR system 100 of FIG. 1, each viewer's eyes are tracked, and an image of the projector aperture is redirected by the projection engine/assembly or projector so as to be placed over (or at the tracked location of) the corresponding eye in real time.

Figure 5A:
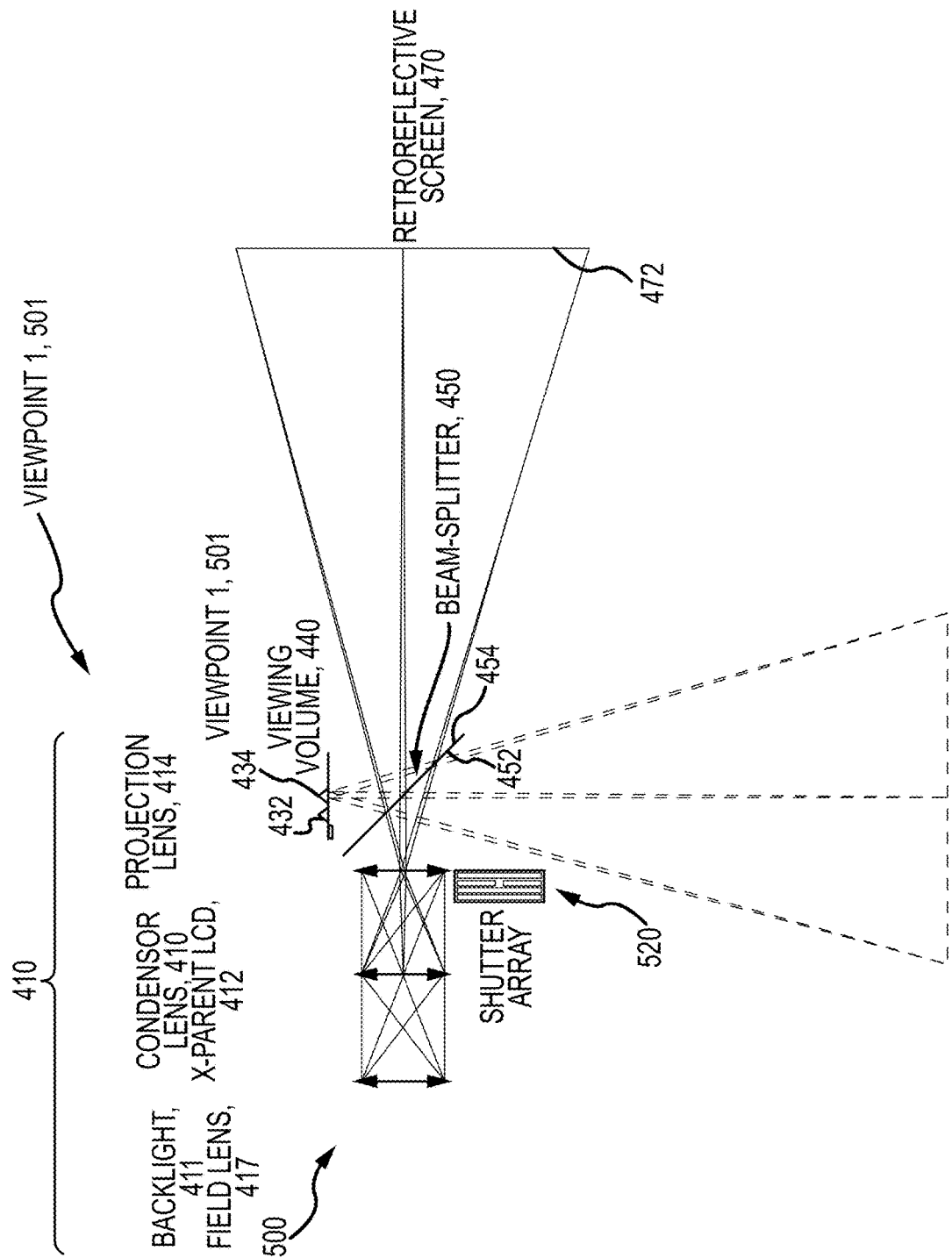

FIGS. 5A and 5B illustrate a visual effect system 500 (which may be implemented to provide an AR, VR, or 3D image-based experience) of the present description operating in a first state to provide a first viewpoint 501 (e.g., to a viewer's left eye) and then in a later second state to provide a second viewpoint 502, respectively. The system 500 includes the projector 410 of FIG. 4 modified to be operable to provide the selective viewpoints 501, 502 in a time multiplexed manner. Specifically, a shutter array 520 is provided at the outlet of the projector 410 (e.g., immediately downstream of the projection lens 414) that is selectively operable to provide the left and right eye images. As understood from FIG. 3, every point on the projection lens/mirror's aperture is a different viewpoint of the modulator 412 and, therefore, also a different viewpoint of the enlarged image on the retroreflective screen's reflective surface 472. The retroreflector 470 creates an image of the lens aperture (and the backlight or illumination source 411) in space (i.e., in the viewing volume 440), where the viewer associated with eyes 432, 434 (in eye boxes) may see the modulator 412. The viewer's eye box in which the retroreflected image is visible is the size of the aperture of the open shutter within the shutter array 520.

With this in mind, the AR system 500 was designed by the inventors to provide an image to only one eye position at any given time with a single projector 410 and without moving parts. This eye position and associated image is dynamic and actively changed by activating a different portion of the shutter array 520, to direct the light toward a different eye box position. That is to say that the AR system 500 can deliver imagery to the viewer's individual eyes in positions 432 and 434 one at a time, based on the viewer's position within the viewing volume, and such that the time-multiplexed image delivery provides 3D imagery to the viewer. Specifically, the system 500 is configured to restrict the aperture of the projection lens 414 to a portion or area which the modulator's image passes through at each operating state (with this portion or area being changed over time). To this end, a shutter array 520 is placed at the aperture of the projection lens 414 in the AR system 500. In other implementations, the shutter array 520 is located at the outlet of the light source 411. In either implementation, it is typically desirable to use a shutter array 520 that is fast (e.g., a ferro-electric or pi-cell or the like) with a small (e.g., human pupil size) cell size and dense matrix addressing scheme (e.g., cross-bar addressing or the like).

By tracking the viewer's eyes 432, 434 and opening only the shutter cell in the array 420 whose corresponding retroreflected image is presently collocated [as determined by mapping provided by the system controller (not shown in FIG. 5 but understood from FIG. 1)] with the viewer's left eye 434, the system 500 can be operated to provide the viewer one image (e.g., the left eye viewpoint 501) of a stereo pair only to that eye 434. At the next switching time in the time-multiplexed operation of the projector 410, only the shutter cell in the array 520 whose retroreflected image is collocated with the viewer's other eye (or right eye in this example) 432 is opened [in response to control signals from the system (or projector) controller] to provide the other (or right) stereo pair image only to that eye 432 at the right eye viewpoint 502. By alternating shutter openings and corresponding displayed stereo pair images on the image modulator 412, the system 500 is operated to allow the viewer to perceive 3D imagery 445 (e.g., AR, VR, or 3D images) floating in space (e.g., a physical set or AR space).

The use of a shutter array can result in significant light loss that may not be acceptable in some applications. To create a more light-efficient display system, a visual effect system 600 is shown that has similar components as system 500 and is operated in switching operating states to present stereo images (i.e., first and second viewpoints 601 and 602) for left and right eyes of a viewer (which are tracked). The system 600 differs from system 500 as it does not include a shutter array but instead utilizes an LED array 611 as the light source for the Köhler illumination projector 610 (i.e., replaces the extended light source 411 with an LED array).

Light from the LED array 611 is relayed to the aperture of the projection lens 414 by the condenser lens 415. The light from each LED of the array 611 passes through the image modulator 412 such that this light 611 (and the modulated image) only passes through one point on the projection lens 414 and, therefore, is only visible at one location in the viewing volume 440. Each LED is one viewpoint of the modulator 412 and screen surface 472. The viewing volume 440 is the size of the lens aperture and also the size of the relayed LED array 611. Although there is only a 2D array of LEDs in light source 611, tracking the eyes 432, 434 of the viewer allows the projector 610 to be controlled so to provide proper perspective to be rendered with system 600 from a volume of eye positions within the viewing volume 400.

The 3D image is still visible to the viewer even when their eyes 432, 434 are not in the precise set of eye box positions to which the imagery is being directed, but the field of view may be reduced. This effect can be compensated for in system 600 by increasing the size of the LED pattern based on the distance of the eyes from the LED plane to provide a larger aperture and field of view for the eye. The use of an LED array 611 as the projector's light source provides better light efficiency, has faster switching time (between left and right eye images and to illuminate proper LEDs based on tracked eye locations in real time), and can provide a denser array of viewing positions than using a shutter array. Also, being solid state (i.e., no moving parts), the projector 610 is more responsive and has less latency than using a projector on 3-axis motorized stage (as may be the case for the system of FIGS. 2A-2C).

Figure 6B:
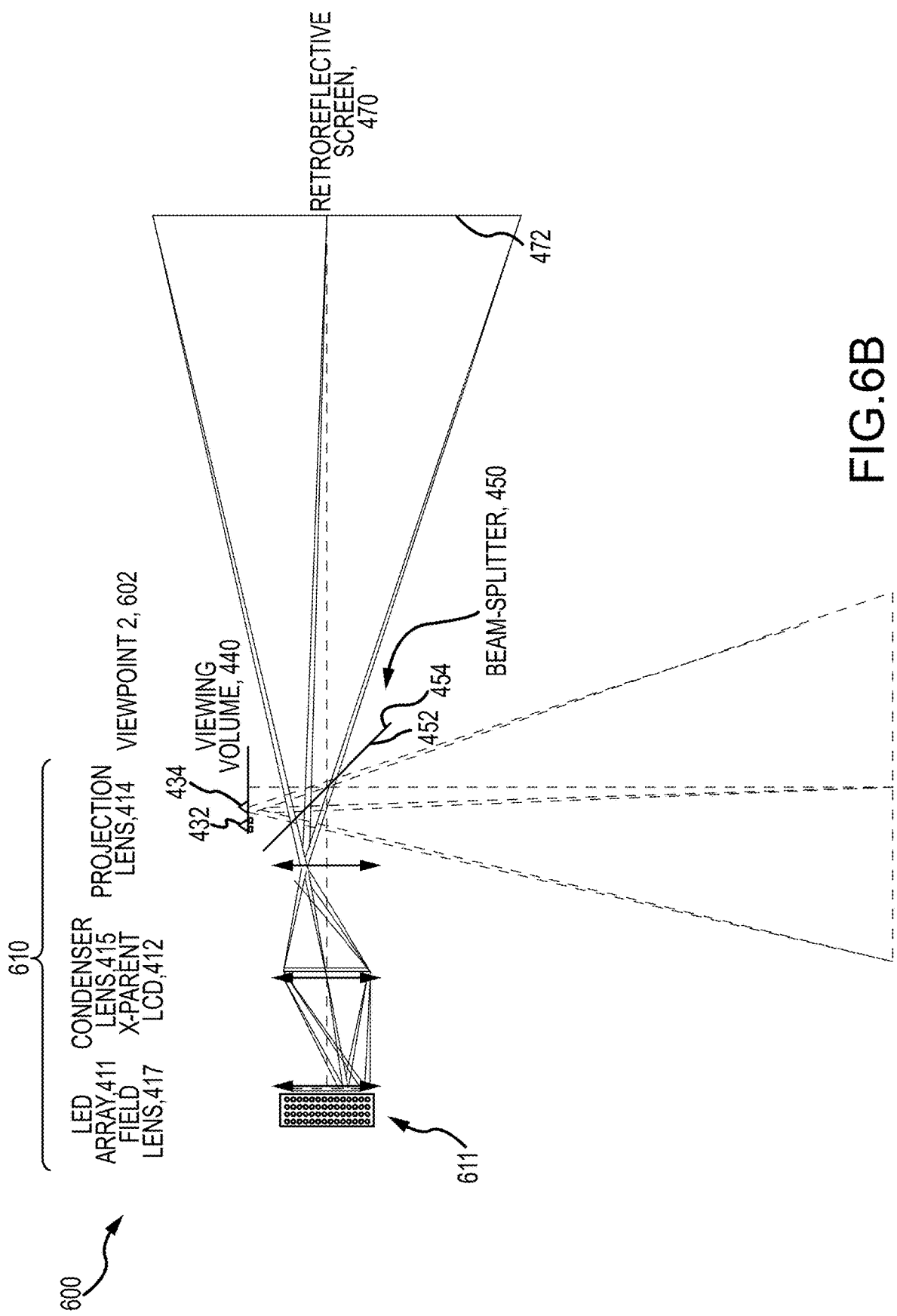
Figure 7:
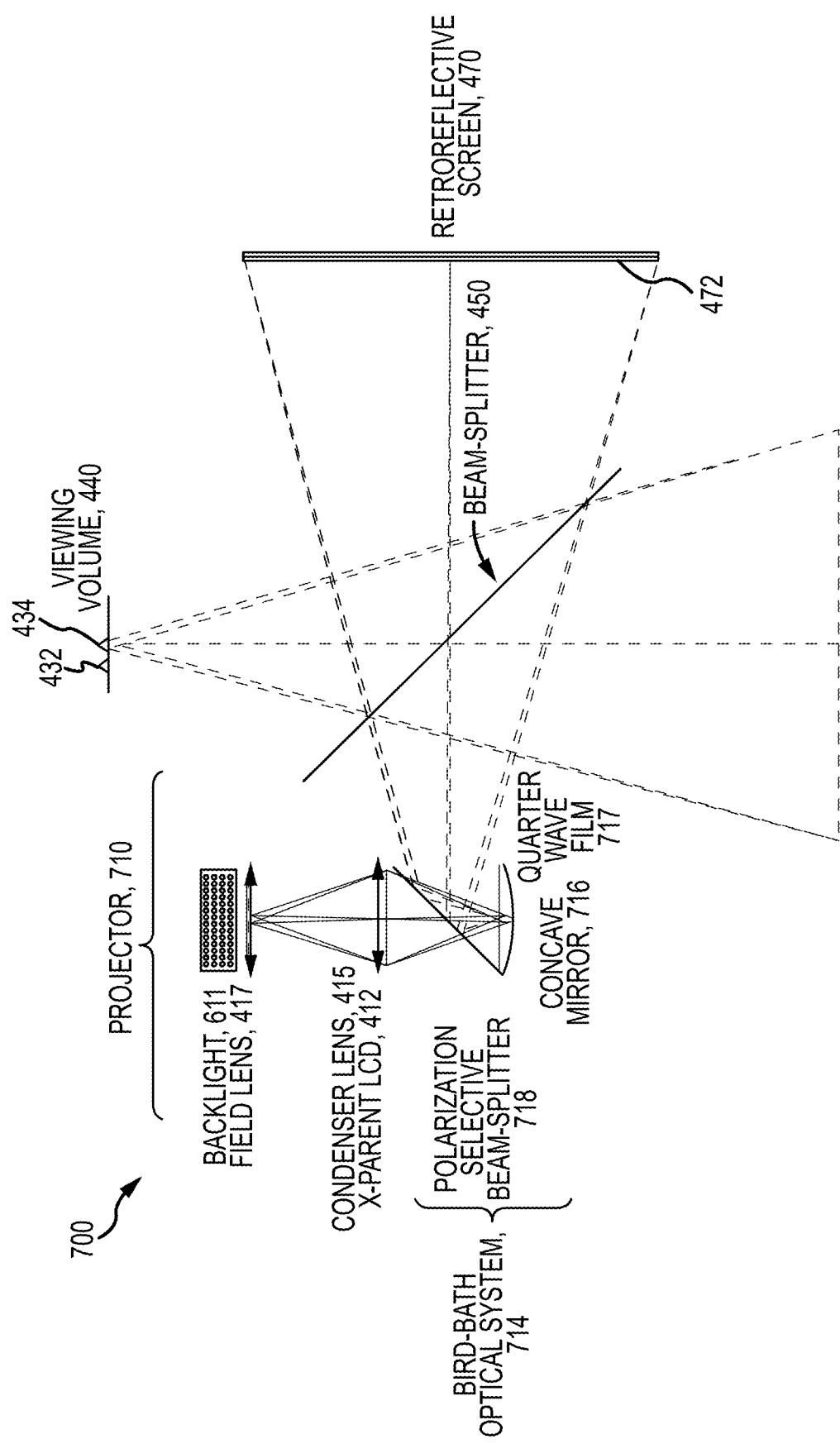
FIG. 7 illustrates a system similar to that of FIGS. 4-6 that uses a projection mirror assembly in place of a projection lens.

The inventors recognized that system 700 of FIG. 7 may be desirable as its Köhler illumination projector 710 is configured differently from projector 610 of FIG. 6 as it includes a bird-bath optical system 714 in place of the projection lens 414. A projection mirror has benefits over a projection lens in some cases due to its smaller f/#, larger potential field of view, and absence of certain aberrations. It also presents benefits in ease of fabrication, compared to sizable lens elements from other embodiments. Because the eye box is the size of the mirror/lens aperture, the aperture should be large to accommodate significant head motion of a viewer in the AR, VR, or 3D image-based experience. The mirror's focal length to aperture size ratio (f/#) should be small to achieve large field of view.

Mirror imaging systems are often better if used on-axis to reduce or even prevent off-axis aberrations and achieve better image quality. This is done in projector 710 by using a projection mirror in the form of bird-bath mirror 714. The bird-bath optical system 714 includes a projection mirror 716 (e.g., a concave mirror or the like) on axis with the LED array 611. A beamsplitter 718 is disposed between the mirror 716 and the modulator 412 to fold the light path and redirect on-axis light received from the modulator 90 degrees towards the retroreflector screen 470. In some preferred embodiment such as the one shown in FIG. 7, the beamsplitter 718 may take the form of a polarization selective mirror (PSM), and a quarter-wave film 717 is provided between the beamsplitter 718 and the concave projection mirror 716 to prevent losses associated with using a 50/50 (half-silvered) beamsplitter.

In some cases, Fresnel lenses can be used for the illumination system (e.g., as a collector lens to concentrate the light from the LED array 611 forward and condenser lens 415 to relay the LED array 611 to the bird-bath optical system 714 through the modulator 412) since the image of the backlight 611 formed by the illumination system need not be a highly detailed coherent image. However, spherical lenses or mirror-based illumination collectors or relay lenses may be used to produce more accurate LED images, which leads to less stereo crosstalk and scatter in the final image delivery.

Figure 8:
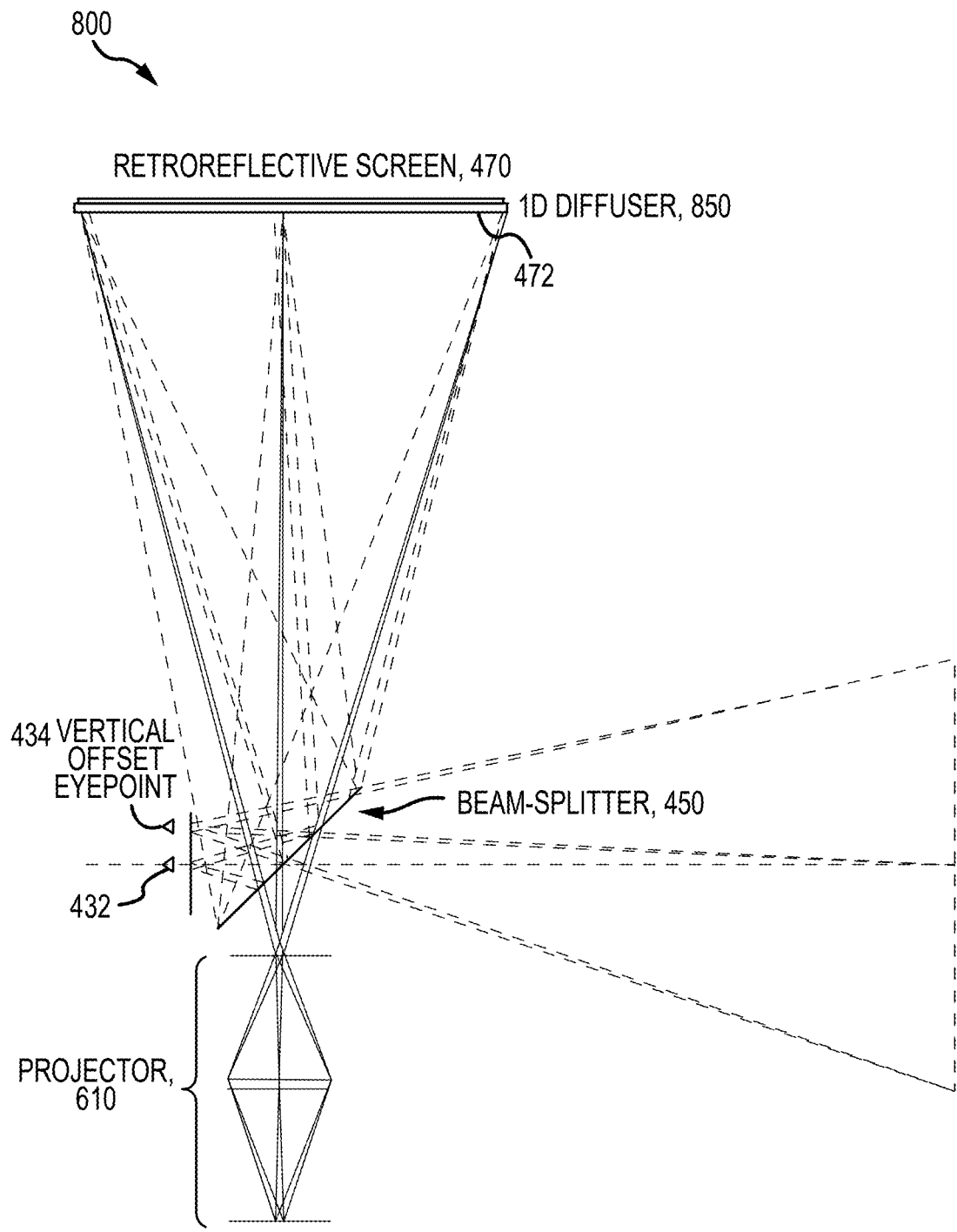
FIG. 8 illustrates a side view of another visual effect system of the present description that is similar to that of FIG. 6 with a 1D retroreflector providing selective viewpoint to a viewer.

FIG. 8 illustrates a side view of another visual effect system 800 of the present description that is similar to that of FIG. 6 but with an anisotropic or 1D (one-dimensional) retroreflector providing selective viewpoint to a viewer achieved through the combination of the retroreflective screen 470 and a 1D diffuser 850 positioned over its reflective surface 472. The system 800 is useful for showing that one can control and/or operate the projector 610 to use one or multiple concurrently illuminated LEDs in the projector's array 611 (in a cross pattern or in a column) to increase the vertical size of the eyebox within the viewing volume to allow for more freedom of movement and eye location on a single axis, and to simplify visual accommodation for participants/viewers of different heights. A further benefit of this approach is that it may ameliorate the challenge of tracking latency or reduce the number of axes of tracking.

Further, the projector's LED array 611 can be operated so that the LEDs are pulse width modulated to provide antialiased patterns (e.g., such LEDs have variable brightness and are not just on or off). This is useful for reducing the flickering that may occur as the pupils of the viewer pass from one set of LEDs to another. The anisotropic 1D diffuser 850 is included and placed over the retroreflector material surface 472. The diffuser 850 returns light toward the projector aperture in a line rather than a point, which allows the image to be seen anywhere in a vertical column rather than only at a single point in the viewing volume 440.

Figure 9:
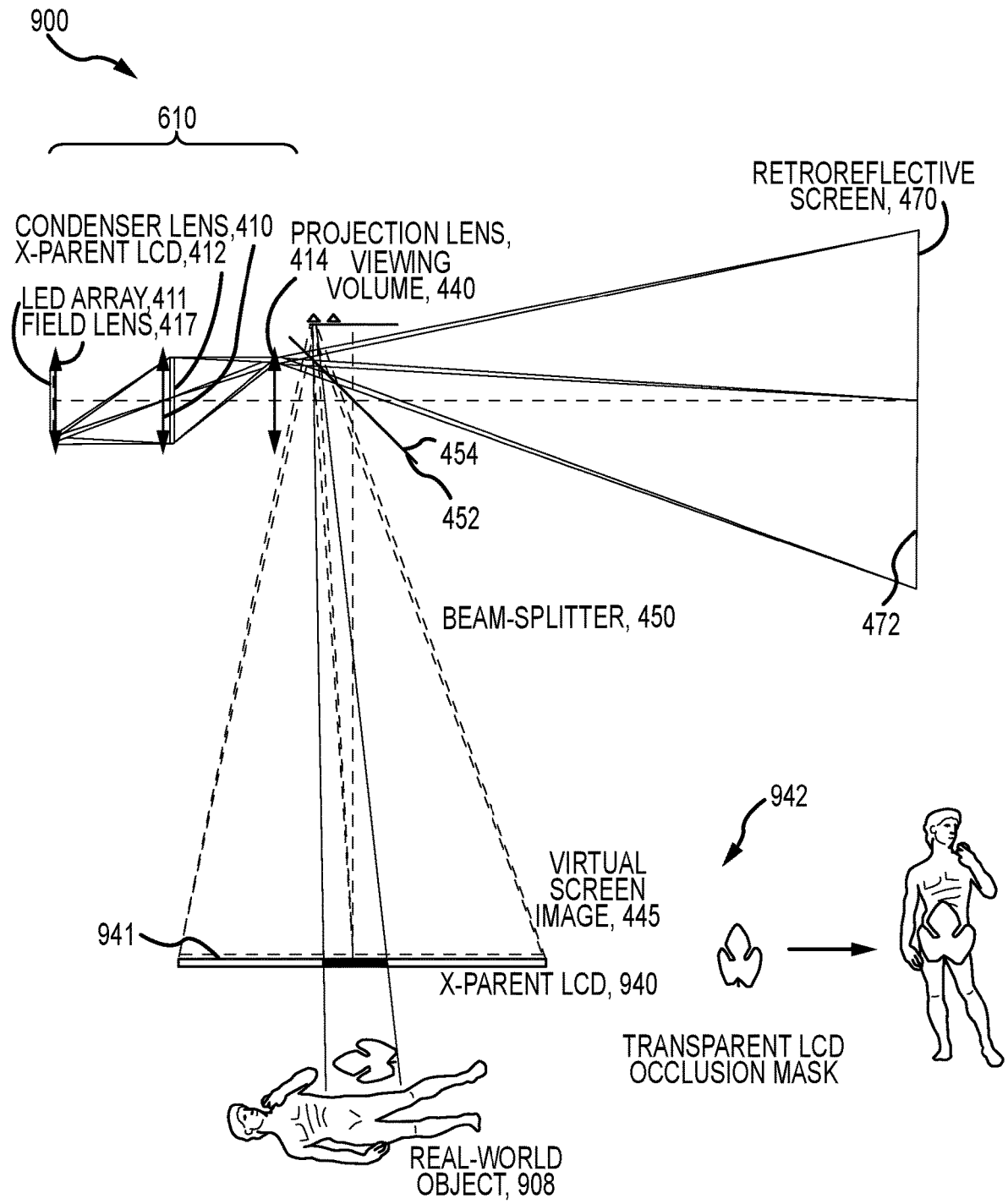
FIG. 9 illustrates a visual system similar to that shown in FIG. 6 further including components to provide occlusion-capable perspective-correct autostereo reflective projection using a transparent LCD mask.

FIG. 9 illustrates a visual effect system 900 similar to that shown in FIG. 6 further including components to provide occlusion-capable autostereo reflective projection using a transparent LCD mask via operation of a transparent LCD 940 positioned with its front surface coplanar or collocated with the virtual screen image 445. In an AR implementation, the light of the augmenting virtual content is added to the background light of the physical or AR space. This can make the AR image low-contrast or ghostly against bright or busy backgrounds. In this regard, the system 900 is a modification of system 600 of FIG. 6 that makes it occlusion-capable (i.e., able to occlude physical background objects such as object 908 in the AR space). The system 900 is also high contrast as it is able to provide black or dark colors.

To this end, a transparent LCD 940 is added in the location of the virtual image 445 of the retroreflective screen 470, and the LCD 940 is operated by the projector or system controller to present corresponding silhouette masks (alternating right/left stereo pairs in some cases) of the overlaid and color-rendered content. In FIG. 9, the displayed mask provided on LCD display surface 941 is shown at 942 indicating how the displayed AR object "blocks" light from the physical object 908 via the mask 942 provided via operations of the LCD 940. The control of an LCD or other transparent display element to provide masks 942 in the system 900 may be performed in the manner shown in any of the following patents, which are incorporated herein by reference in their entirety: U.S. Pat. No. 8,857,994 ("Transparent Display with Dynamic Mask"); U.S. Pat. No. 8,976,323 ("Switching Dual Layer Display with Independent Layer Content and a Dynamic Mask"); and U.S. Pat. No. 9,132,361 ("Projectable Masks").

The inventors recognized in some embodiments of the visual effects systems such as system 700 in FIG. 7 that the illumination optics 710 need to gather and concentrate the light from LEDs in the LED array 611 to evenly illuminate the transparent LCD panel 412 and imprint the image on the LCD panel 412 into the LED light's caustic, and also to relay the image of the LED array 611 to (or near) the projection mirror 716 (e.g., a concave mirror or the like). This light is projected towards and retroreflected by the retroreflective surface 472 of the retroreflective screen 470 back to the image of the LED array 611 at (or near) the projection mirror 716, then deflected by large beam-splitter 450 to form eye boxes in viewing volume 440 so that the projected (virtual) image can be viewed at eye positions 432 and 434.

Further, though, it was understood by the inventors that aberrations introduced by the illumination optics may create non-uniformities and distortion in the retroreflected image of the LCD panel/screen viewed at the eye boxes. Furthermore, the overall volume of the projector system can be quite large due to the space required to expand the LED's light to the size of the LCD panel and also to reimage/relay that light back to a point on (or near) the projection mirror/lens. The use of the birdbath arrangement does reduce the overall length in the projection subsystem (space between the LCD panel and the projection mirror). In a similar manner, a birdbath or other folding optics (mirrors) could be used to fold the illumination path.

Figure 12:
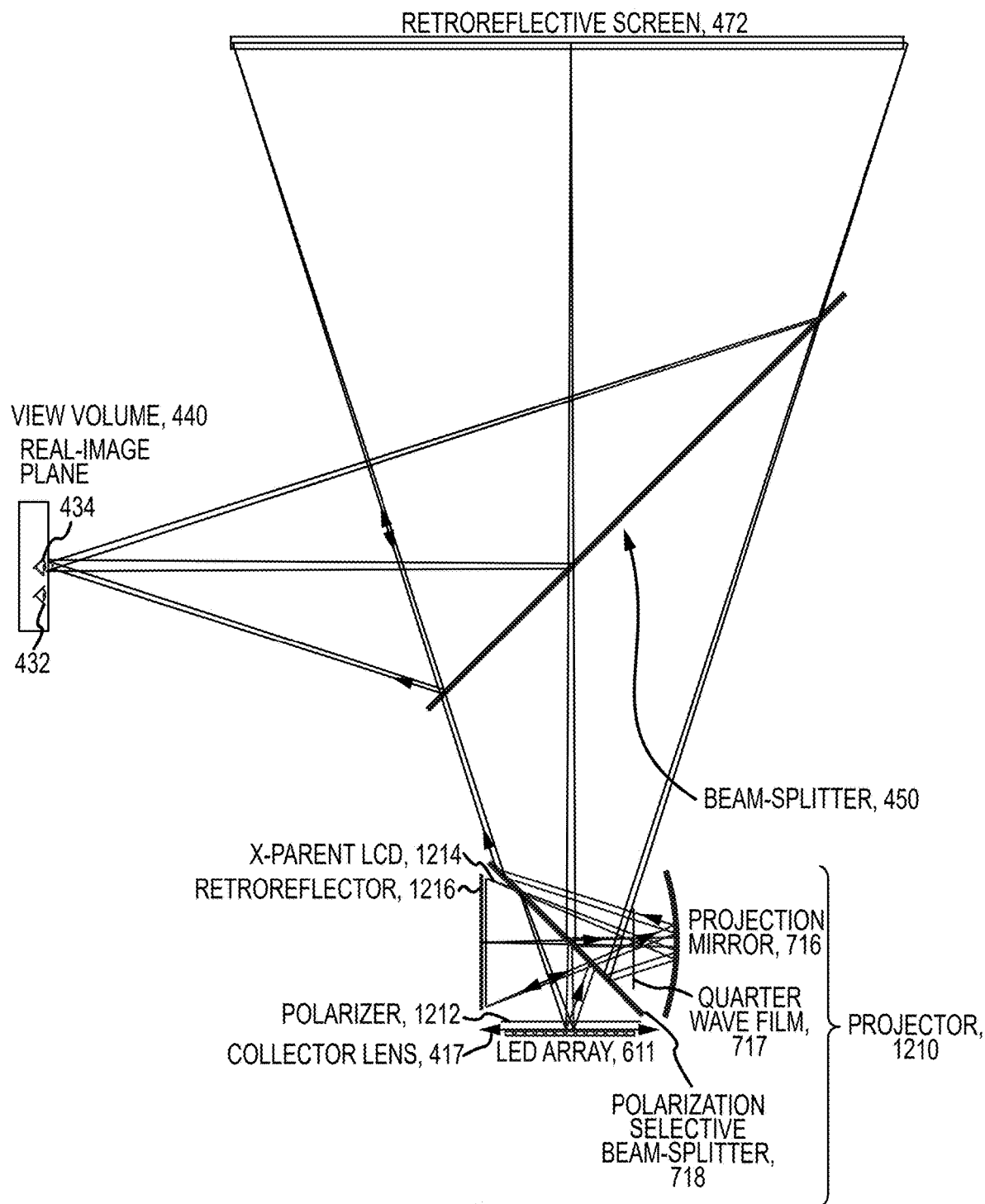
FIG. 12 illustrates another visual effect system similar to those in FIGS. 4-9 but using compact retroreflective autostereo projection that makes use of retroreflected illumination.

However, the inventors further determined that it is possible to achieve an even more compact projector system for use in the retroreflective autostereoscopic projection system (or visual effect system), while reducing/eliminating aberrations introduced by the illumination optics (or projector/projector assembly). To this end, FIG. 12 illustrates another visual effect system similar to those in FIGS. 4-9 but using compact retroreflective autostereo projection (with projector 1210) that makes use of retroreflected illumination with an LED array image (e.g., LED array 611 as a backlight) offset from the projection mirror 716 (e.g., a concave mirror or the like). Hence, similar components are given similar numbering in this figure (as well as following FIG. 13).

In the compact arrangement shown in FIG. 12, the LED array 611 shares the same birdbath system as the projection subsystem and is placed in the leg opposite to the birdbath-output (and 90 degrees from the arms containing the LCD panel 1214 and projection mirror 716). A polarizer 1112 is placed in front of the LED array 611 so the light is polarized (or polarized LEDs are used in array 611 in some embodiments). The orientation of this (linear) polarization is such that it reflects off the polarization selective mirror beamsplitter 718 towards the LCD panel 1214, illuminating it. The LCD panel 1214 has its polarizer and analyzer removed (so it only acts as a pixelated polarization modulator).

A polarization preserving retroreflector (e.g., cat's-eye or beaded retroreflector) 1216 is placed immediately behind the LCD panel 1214, such that the light passing through the LCD panel 1214 is retroreflected back through the LCD panel 1214 retracing its path towards the beamsplitter 718 and LED array 611. The LCD panel 1214, with an image presented on its screen, modulates the polarization of the illumination, such that bright pixels have a $\pi/2$ (or multiple $(2n+1)\pi/2$, n=0, 1, 2 ...) phase shift so that light is now an orthogonal polarization to the incoming light. This light (from the projector's retroreflector 1216 and LCD 1214) is then capable of passing through the polarization selective mirror 718 to form an aberration free real image of the LEDs at (or near) the projection mirror 716. Dark pixels have an $n\pi$, n=0, 1, 2 ... phase shift and are, therefore, reflected by the polarization selective mirror beamsplitter 718 (back to LED array 611). Phase shifts in between 0 and $\pi/2$ are partially transmitted and reflected (leading to brightness modulated light according to the image presented on the LCD panel 1214). The transparent LCD 1214 with its polarizer and analyzer removed still imparts an image on the light caustic, since the LED polarizer 1212 acts as the polarizer for projector 1210 and the polarization selective beamsplitter 718 acts as the analyzer to change the polarization modulation into brightness modulation.

Figure 13:
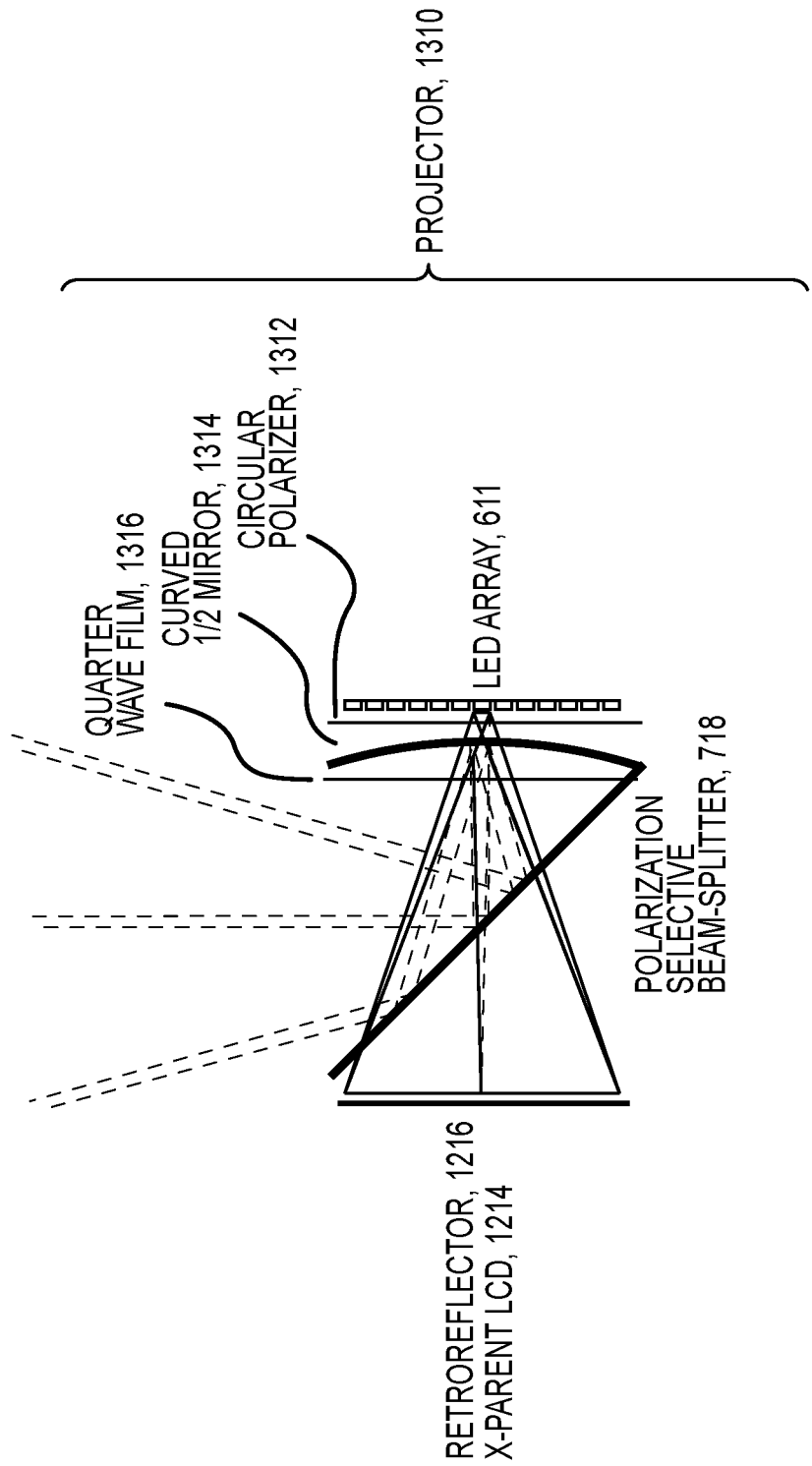
FIG. 13 illustrates another embodiment of a projector for use in a visual effects system of the present description that is configured to provide compact retroreflective autostereo projection using retroreflected illumination and pancake optics.

Similarly, a pancake optic arrangement could be used with the birdbath system to achieve a similar compact system. In this regard, FIG. 13 illustrates another embodiment of a projector 1310 for use in a visual effects system of the present description that is configured to provide compact retroreflective autostereo projection using retroreflected illumination and pancake optics. Light from the LED array 611 passes through a (circular) polarizer 1312, then through a half-mirrored curved projection mirror 1314 and a quarter-wave plate or film 1316 to become linearly polarized. This light passes through the polarization selective birdbath beam splitter 718 and evenly illuminates the transparent LCD panel 1214 (with polarizer and analyzer removed) that is backed by a polarization-preserving retroreflective sheet 1216 (as found in projector 1210 of FIG. 12).

The light is retroreflected back through the LCD panel 1214 having been shifted $(2n+1)\pi/2$ or $n\pi$ in phase depending upon the image presented on the LCD panel 1214. Light with an $n\pi$ shift in phase passes back through the polarization-selective birdbath beamsplitter 718, while light with a $(2n+1)\pi/2$ phase shift is reflected away from the beamsplitter 718. Light that passes through the birdbath 718 passes through the ¼-wave plate 1316 to become circularly polarized. That light is then reflected and focused by the curved half mirror (acting as a projection mirror) 1314 to focus the light onto the main retroreflector screen (screen 472 shown in, for example, FIG. 12) after reflection from the beamsplitter 718. Upon reflection from mirror 1314, this light has the opposite handedness of circularly polarized with the incident light, and then passes through the ¼-wave plate 1316 again to become linearly polarized light with the orthogonal orientation of the incoming light. Thus, it is reflected by the polarization selective bird-bath mirror 718 towards the main retroreflector screen (e.g., screen 472). The light focused on the main retroreflective screen is then retroreflected back toward the projection mirror 1314, but it is deflected by the main beamsplitter of a visual effect system with projector 1310 (e.g., beamsplitter 450 in the system of FIG. 12 or another of the visual effect systems taught herein) to form eye boxes in a viewing volume, through which the viewer can see the virtual image of the projection on the retroreflective screen surface (screen 470, for example).

With the visual effect systems in mind, the inventors further recognized it may be useful to utilize a polarization selective mirror as the main beamsplitter. Particularly, with the use of polarized light and a polarization selective retroreflector in the projector, the light efficiency of the visual effect system can be further improved by using a polarization selective mirror for the main beamsplitter, e.g., similar to how it is used in the polarization selective mirror birdbath shown in FIG. 12. The main beamsplitter (e.g., beamsplitter 450 in systems shown above) may in some implementations be constructed using a polarization selective mirror. The light from the projector or projection system would be directed so as to pass through this polarization selective mirror and through a polarization wave plate/retarder to be focused and retroreflected off a polarization preserving retroreflective screen. The retroreflected light would again pass through the retarder such that the cumulative retardance of the polarized light would result in the opposite handedness of the projected light. This would cause it to be reflected by the polarization selective mirror of the main beamsplitter to form eye boxes in a viewing volume as discussed above.

Figure 10:
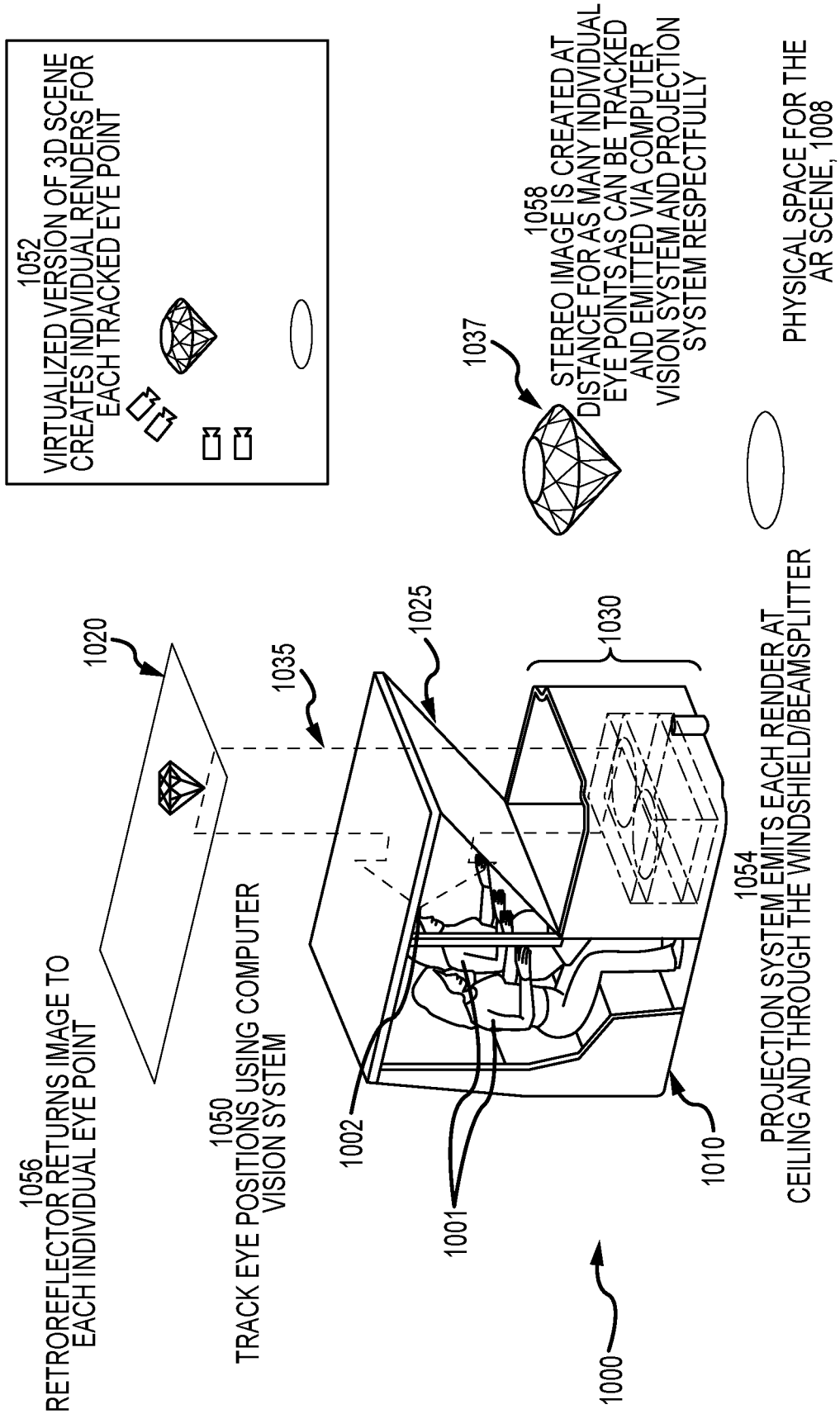
FIG. 10 is a functional or schematic flow diagram of operations of a visual effect system of the present description used to provide a perspective-correct autosterescopic experience to riders of a vehicle (e.g., a theme park ride vehicle)

FIG. 10 is a functional or schematic flow diagram of operations of a visual effect system 1000 of the present description that may be used, for example, to provide an autostereoscopic AR experience to riders 1001 of a vehicle (e.g., a theme park ride vehicle) 1010. In this embodiment of the system 1000, a projection system or engine 1030 is mounted upon the vehicle 1010 to travel along the ride path with the viewers 1001, and a beamsplitter 1025 is mounted at a 45-degree offset angle (45-degrees in the projection path of the system 1030) vertically above the projection system 1030 and appears to the viewer 1001 to be a windshield. As shown at operating step or state 1050, the rider's or viewer's eye positions 1002 in the vehicle 1010 are tracked using, for example, a computer vision system (not shown on/in the vehicle but well understood by those in the art). The tracked eye positions 1002 are provided to the system controller for use in creating the perspective correct and optionally stereo media portion of the visual effect (e.g., AR) experience.

Specifically, as shown at step 1052, the system controller provides the tracked eye positions 1002 as input to software used to provide stereo content to the projection system 1030. In operating state or step 1052, a virtualized version of a 3D scene is used via left and right eye CG cameras to create individual renders for each tracked eye point 1002 of the viewers/riders 1001. This rendered content (e.g., a digital 3D object for use in augmenting a physical space for the AR scene 1008 visible through the windshield 1025 for the viewers 1001) is provided by the system controller in control signals to the projection system 1054.

As shown, the projection system 1030 in step or state 1054 emits, through the beamsplitter 1025, each render at a reflective projection screen 1020 that may be placed on the ceiling of the ride space above the vehicle 1010 (when it is parked or docked near the physical space for the AR scene 1008). The screen 1020 may have a surface facing the projection system 1030 that is formed of retroreflective material, and, at operating step or state 1056, the retroreflective screen or retroreflector 1020 returns the projected image to each individual eye point 1002 via a reflection off the upper surface of the beamsplitter 1025. As shown at step or operating state 1058, the operations of the system 1000 result in a stereo image or AR object 1037 being created at a distance (e.g., the distance between the outlet of the projection system 1030 and the reflective screen 1020, or other as digitally manipulated) into the physical space for the AR scene 1008. The image 1037 is provided for as many individual eye points 1002 as can be tracked and emitted via computer vision system and projection system 1030, respectively.

Figures 11A, 11B:
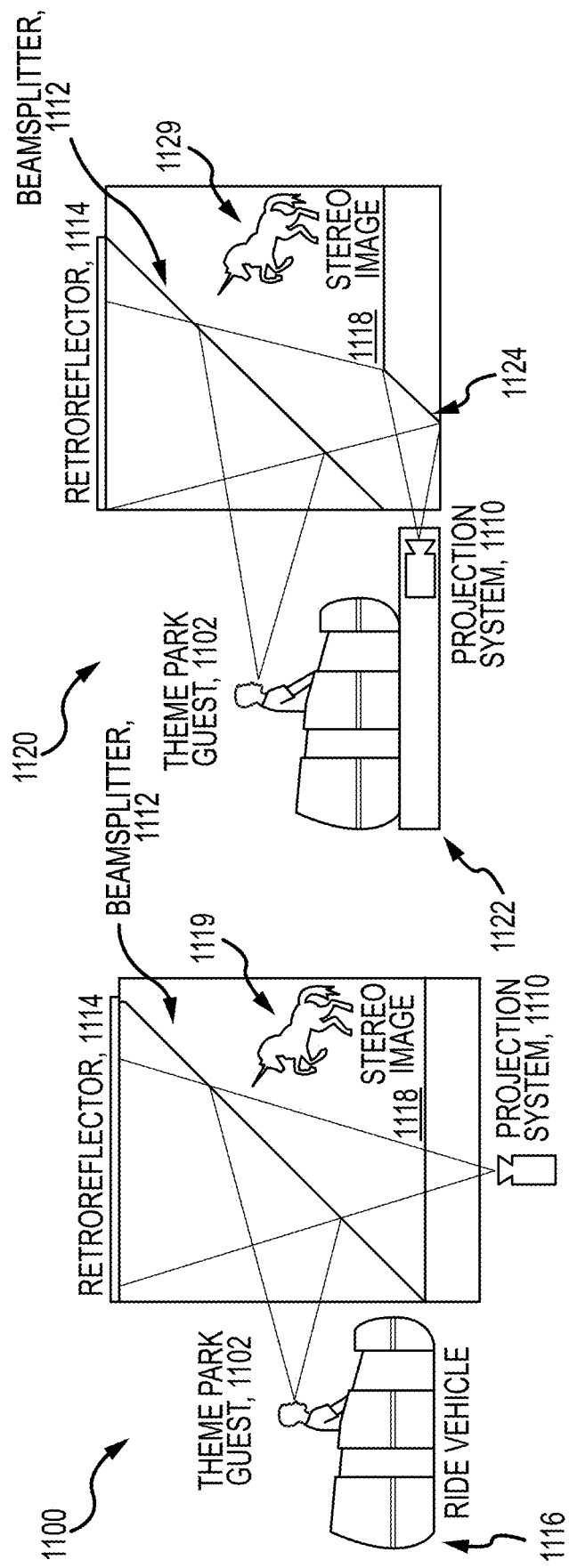
FIGS. 11A-11C illustrate three differing implementations or use cases for the perspective-correct autosterescopic retroreflector-based projection systems of the present description.
Figure 11C:
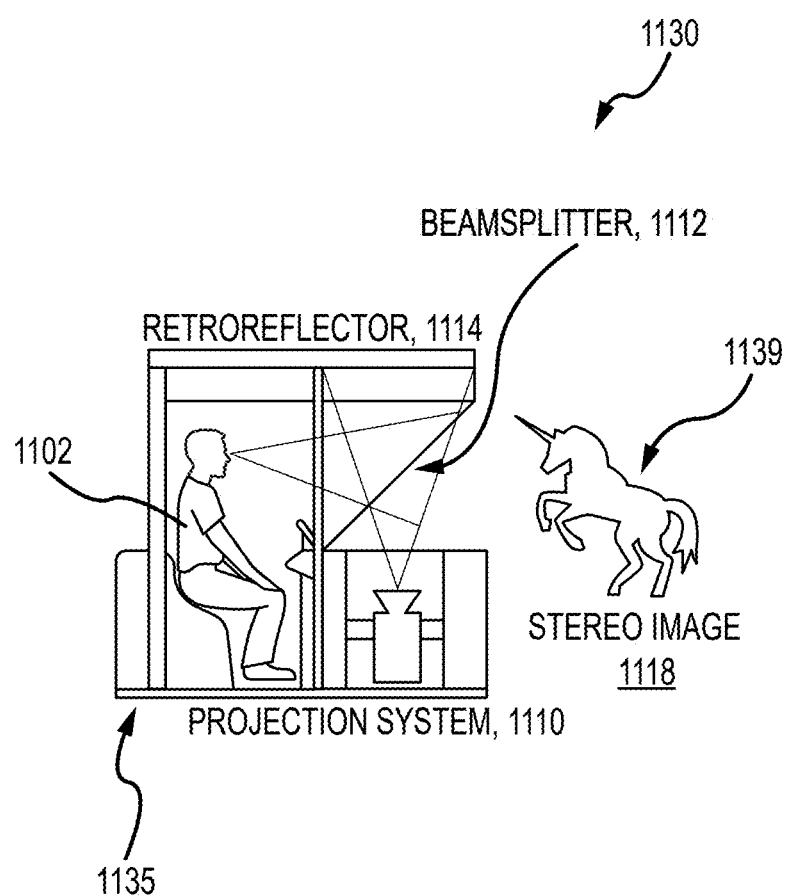

With the embodiment or use case of FIG. 10 understood, it may be useful to describe a few additional exemplary systems in which the ideas for enhanced autostereoscopic perspective-correct image-based experiences may be implemented. FIGS. 11A-11C illustrate three differing implementations or use cases for the autostereoscopic retroreflector-based projection systems of the present description. FIG. 11A illustrates a visual effect system 1100 in which all of the projection and display components are offboard a ride vehicle 1116 carrying a rider/viewer 1102, and this system 1100 may be used outside the ride environment such as for a walk-up kiosk or other setting where the viewer 1102 may not be in a vehicle 1116. The system 1100 includes a projection system 1110 (mechanical or solid-state design as discussed above) projecting upward into a physical space for the AR scene 1118 (but projection may be downward, too, or horizontal or any other useful angle). The vehicle 1116 is shown to be parked or docked adjacent to the AR space 1118 with the viewer/rider 1102 facing the physical space for the AR scene 1118 a distance above the projection system outlet.

A retroreflector or reflective screen 1114 is positioned above the projector 1110 such as upon the ceiling defining the physical space for the AR scene 1118 or the like. A beamsplitter 1112 is disposed at a 45-degree angle between the projection system 1110 and the retroreflector 1114 so that when the projection system 1110 emits stereoscopic images/light, the viewer 1102 perceives a stereo AR object 1119 in the physical space for the AR scene 1118 without the need for 3D glasses or headgear. During operations of the AR system 1100, the vehicle 1116 (configured for any useful propulsion system or technique) arrives at a scene 1118 with a fully offboard AR generation assembly or system. The vehicle 1116 is operated so it parks in a position that aligns the projection system 11110 with the viewpoint of the rider 1102. The entirely offboard system, as discussed above, overlays stereo 3D imagery 1119 on the physical scene 1118.

FIG. 11B illustrates a hybrid visual effect system 1120 in which a portion of the projection/display assembly is provided on the vehicle while the rest is provided offboard. Particularly, in this example, the projection system 1110 is mounted upon the vehicle 1122 and configured to project (when operated) into the physical space for the AR scene 1118 onto a beamsplitter/mirror element 1124 to provide an upward projection stream useful with the components of the system 1100 including the beamsplitter 1112 and retroreflector 1114 to create a stereo 3D image or object 1129 (e.g., an AR or VR object) for the viewer/rider 1102 or their tracked left and right eye positions.

The vehicle 1122 in system 1120 has a set of onboard projection systems 1110 that are calibrated to each respective seat of riders 1102, e.g., a projection system for each rider 1102 that may include two projectors in a mechanical design or a single projector in a solid-state design. As the vehicle 1122 moves through a ride or attraction space in a theme park, the vehicle 1122 (with the onboard projection system 1110) approaches the physical space for the AR scene 1118, which has beamsplitters 1112 and 1124 and a retroreflector 1114 to produce 3D stereo imagery 1129 (when the projection system operates to display 3D content suited to the tracked eye positions of rider(s) 1102) overlaid on physical objects and/or scenery in the physical space for the AR scene 1118.

FIG. 11C illustrates that all of the components of the projection/display system can be provided in a self-contained manner as shown with visual effect system 1130 (which may take the form of system 1000 of FIG. 10). The vehicle 1135 is adapted to transport one or more riders/viewers 1102 who have their eye positions tracked with onboard computer vision or other technologies. The self-contained system 1130 includes an onboard projection system 1110 that projects onto a retroreflector 1114, which may be mounted on the ceiling of the vehicle's body (or any place a distance from the outlet of the projection system 1110. A beamsplitter 1112 is disposed between the projection system 1110 and the retroreflector 1114 and acts to reflect light from the retroreflector 1114 to the tracked left and right eye positions of the viewer 1102 so that they perceive the stereo 3D image or object 1139 concurrently with light from physical objects/scenery in the physical space of the AR scene 1118 at which the vehicle 1135 is parked, docked, or actively moving through the physical space 1118 as the light from the physical objects/scenery is passed through the beamsplitter 1112 to the interior of the vehicle 1135. The self-contained system 1130 is well suited for a variety of uses such as a traditional dark ride or a free-ranging vehicle, and it is also useful for walk-up kiosks or the like where the viewer 1102 may walk up to the seat shown or stand next to the beamsplitter 1112 facing the AR space 1118. This particular arrangement, as illustrated in FIG. 11C is particularly useful in allowing the system to dynamically and continuously present stereo 3D imagery to a viewer/participant while actively moving through physical space.

As discussed above, a Lambertian scatterer may be included in a projector assembly or projection system to redirect and randomly polarize any light that has not previously passed through the brightness-enhancing film so that more and more of the light can achieve an orientation that could be transmitted through the film. This would be achievable with the inclusion of a custom LED surround structural array that serves as the Lambertian scatterer, in the form of an extruded grid. This structural array functions to retain light within a desired region, in order to be able to potentially achieve the proper polarization orientation for brightness-enhancing film transmission.

For example, FIGS. 14A and 14B show a portion of an LED structural array or extruded grid 1400 during two operational steps as discussed below. Light emitted from an LED is typically randomly polarized and emitted in all directions from a point-light source. The LED's light illuminates the transparent LCD panel and is then refocused to form eyeboxes at the projection mirror. Since the LCD panel requires polarized light to modulate the illumination and form an image, half (or more) of the LED light is absorbed and wasted. Furthermore, an array of discreet LEDs will have gaps between them, which results in flickering imagery as the viewing location moves from eyebox to eyebox. To provide polarized evenly diffuse area illumination, polarized light recirculation and a mirrored egg-crate structure can be used in the LED structural array as shown with portion 1400 of FIGS. 14A and 14B.

As shown, the cell floor includes an LED 1402 (with one shown for simplicity but many would be included in the array). A mirrored egg-crate structure 1401 is placed over the LED array including LED 1402 such that each LED 1402 is surrounded by four of the reflective walls. This forms individually addressable illumination cells around each LED (as exemplified by LED 1402). The floor of the cells is covered with a Lambertian scatterer 1410, which is a surface that scatters light evenly in all directions and also randomly polarizes reflected light.

Light emitted from the LED 1402 emanates in all directions (e.g., in a hemisphere) and is randomly polarized (i.e., composed of equal amounts of vertical and horizontal polarized light). The randomly polarized light impinges on the polarization selective mirror 1420, where the horizontal components are transmitted towards the LCD panel (not shown in FIGS. 14A and 14B) and the vertical components are reflected back into the cell as shown, for example, in FIG. 14A.

As shown in FIG. 14B, the reflected vertically polarized light may then impinge on the Lambertian scatterer 1410 on the cell floor (or reflect off one of the mirrored walls 1404 then onto the floor and scatterer 1410), where it is randomly polarized again and scattered in all directions (e.g., in a hemisphere). This scattered light then travels back towards the cell roof 1420, impinging at a different location and angle then the previous interaction. The process repeats, including transmitting horizontally polarized light and recycling vertically polarized light to become scattered in all directions and randomly polarized, until horizontally polarized light is evenly and diffusely emitted over the entire cell's roof and mirror 1420. The polarization light recycling provided in portion 1400 and the use of a mirror egg-crate provided by walls 1404 allows the efficient use of the light from the LED 1402 because all the light eventually becomes polarized in the desired polarization orientation (as may be required by the LCD panel).

As noted earlier, the system may be configured to utilize replication optics to generate a projection array in order to better optimize the system. FIG. 15 illustrates an exemplary system 1500 utilizing various replication optics 1520 while FIGS. 15B-15N illustrate several embodiments for these optics 1520. The system 1500 includes a transparent LCD panel 1510 and a multi-element projection lens array 1530 that provide their output onto a beamsplitter 1540 and retroreflector screen 1550 (as discussed above). Further, the system 1500 includes replication optics 1520 disposed between the LCD panel 1510 and the projection lens array 1530 to provide replicas 1525 of the image output by the LCD panel 1505.

Due to the large aperture and wide FOV of the display, providing even illumination and high-resolution imagery over the entire field and viewing volume may become difficult in some applications. The inventors recognized that an array of projectors, with their smaller apertures and multi-element projection lenses, can provide the desired image quality but suffers from large gaps between eyeboxes and the need to align, calibrate, and provide individual video feeds to each of the many (i.e., dozens to hundreds) of projectors. Ideally, then, the system 1500 is configured to use the replication optics 1520 such that the imagery from a single LCD panel 1510, which is operated to alternate between displaying left and right eye stereo images, is controllably relayed and/or replicated as shown at 1525 in FIG. 15A under the appropriate multi-element projection lens (e.g., corresponding to the viewer's current eyebox) in a tightly packed projection lens array 1530.

Figure 15A:
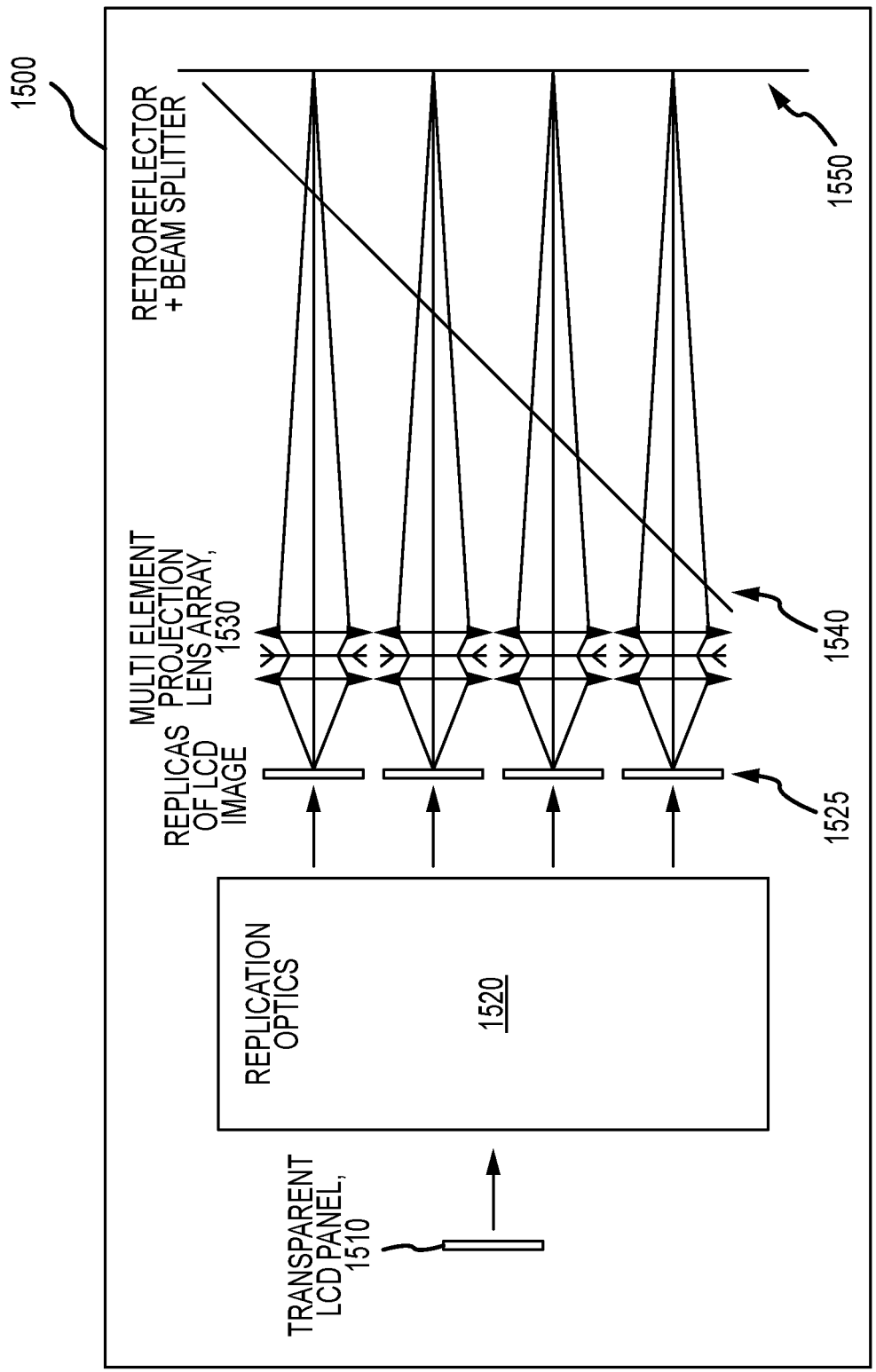
FIGS. 15A-15N are schematic illustrations showing, respectively, a projector assembly including replication optics and a number of useful embodiments of such replication optics.
Figure 15B:
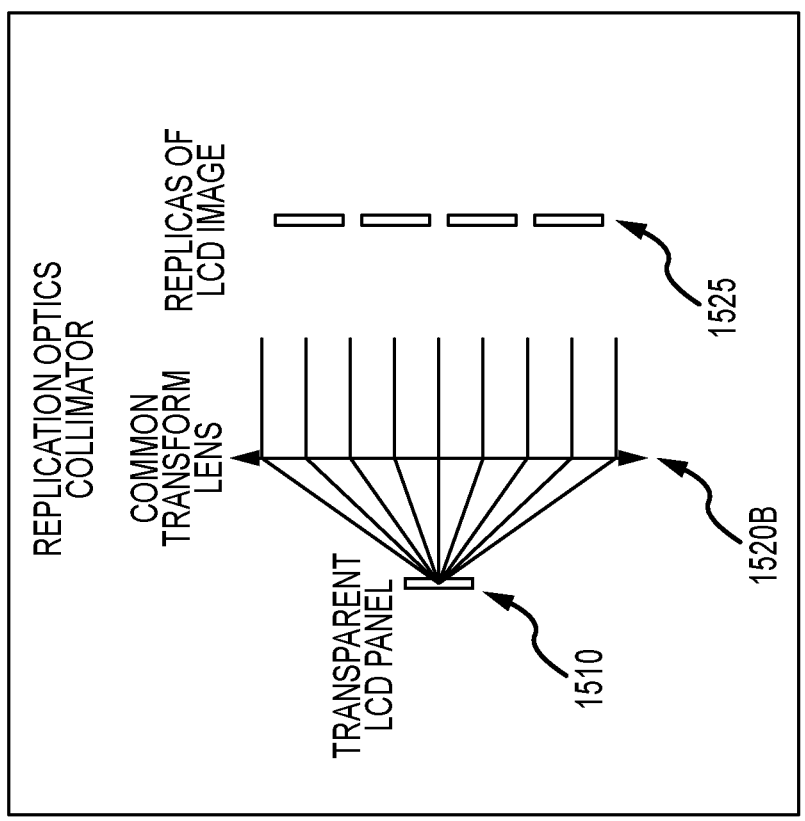
Figure 15C:
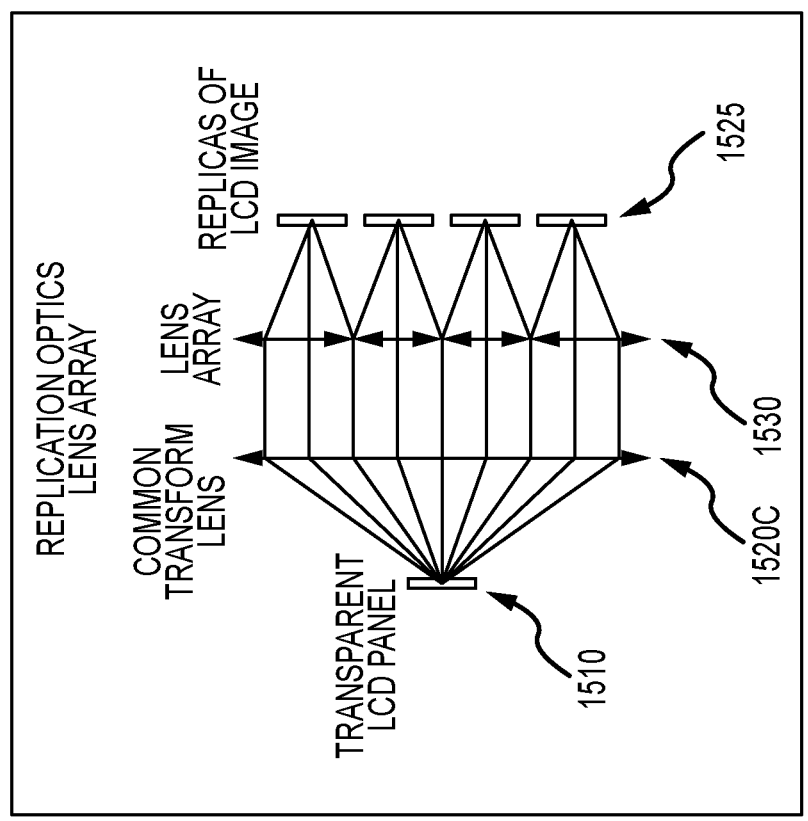
Figure 15D:
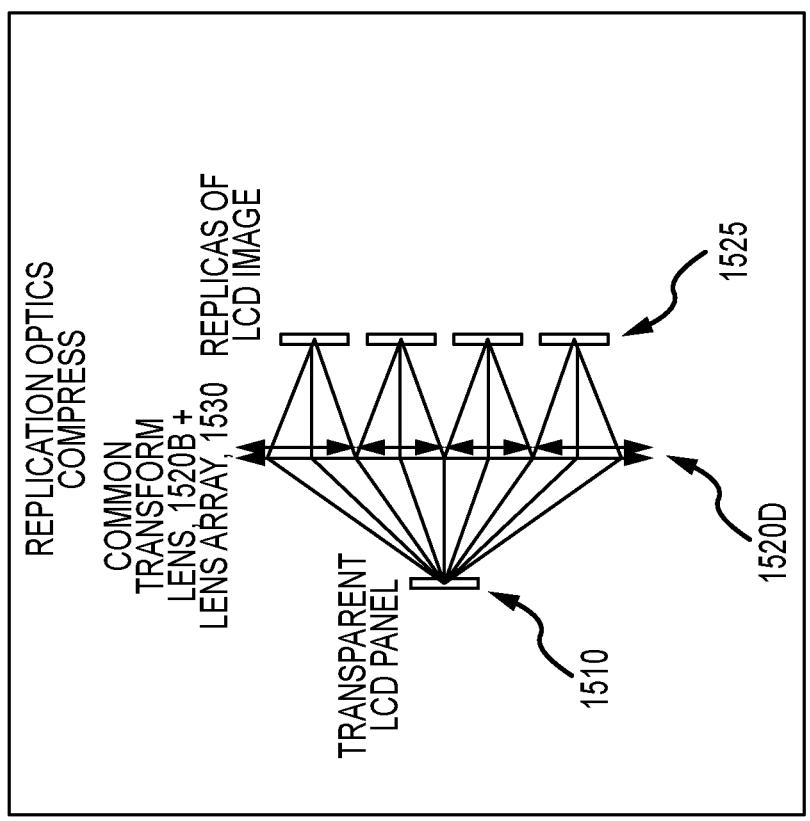
Figure 15E:
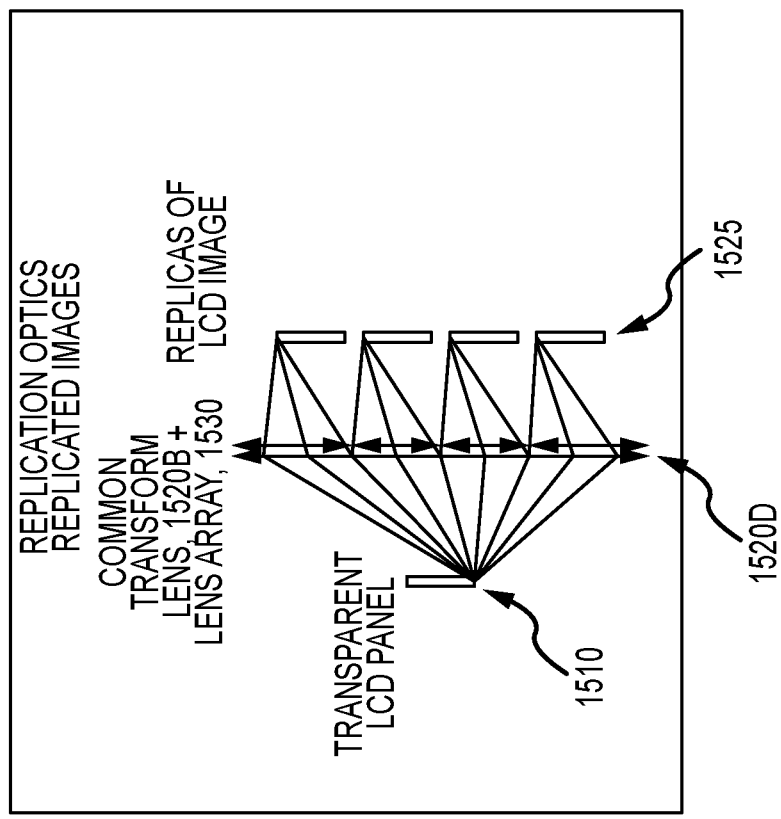

FIG. 15B illustrates a portion of the system 1500 in which the replication optics 1520 take the form of or include a common transform lens 1520B. In this embodiment, the replication optics 1520 use a combination of the transform lens 1520B along with the lens array 1530 (shown in FIG. 15A) to make copies 1525 of the object at the image plane (one for each lens in the lens array 1530). Light from a point on the object (here the LCD panel 1510) emanates uniformly in all directions. The common transform lens 1520B collimates this light into parallel rays. As shown in FIG. 15C, each lens in the lens array 1530 takes a portion of this collimated beam and focuses it back to a point on the image plane (as shown at 1525, with one point for each lens in the lens array 1530. Similarly, off-axis points on the object LCD panel 1510 are also imaged behind each lens in the lens array 1530 to form an array of replicas 1525 of the LCD image. A compressed version or embodiment of the replication optics shown at 1520D in FIGS. 15D and 15E (these figures representing both on- and off-axis demonstrations) provides a combination of the transform lens 1520B and each lens of the lens array 1530 and acts as an offset relay to make a copy of the object LCD panel 1510 at the lens' image plane.

Figure 15F:
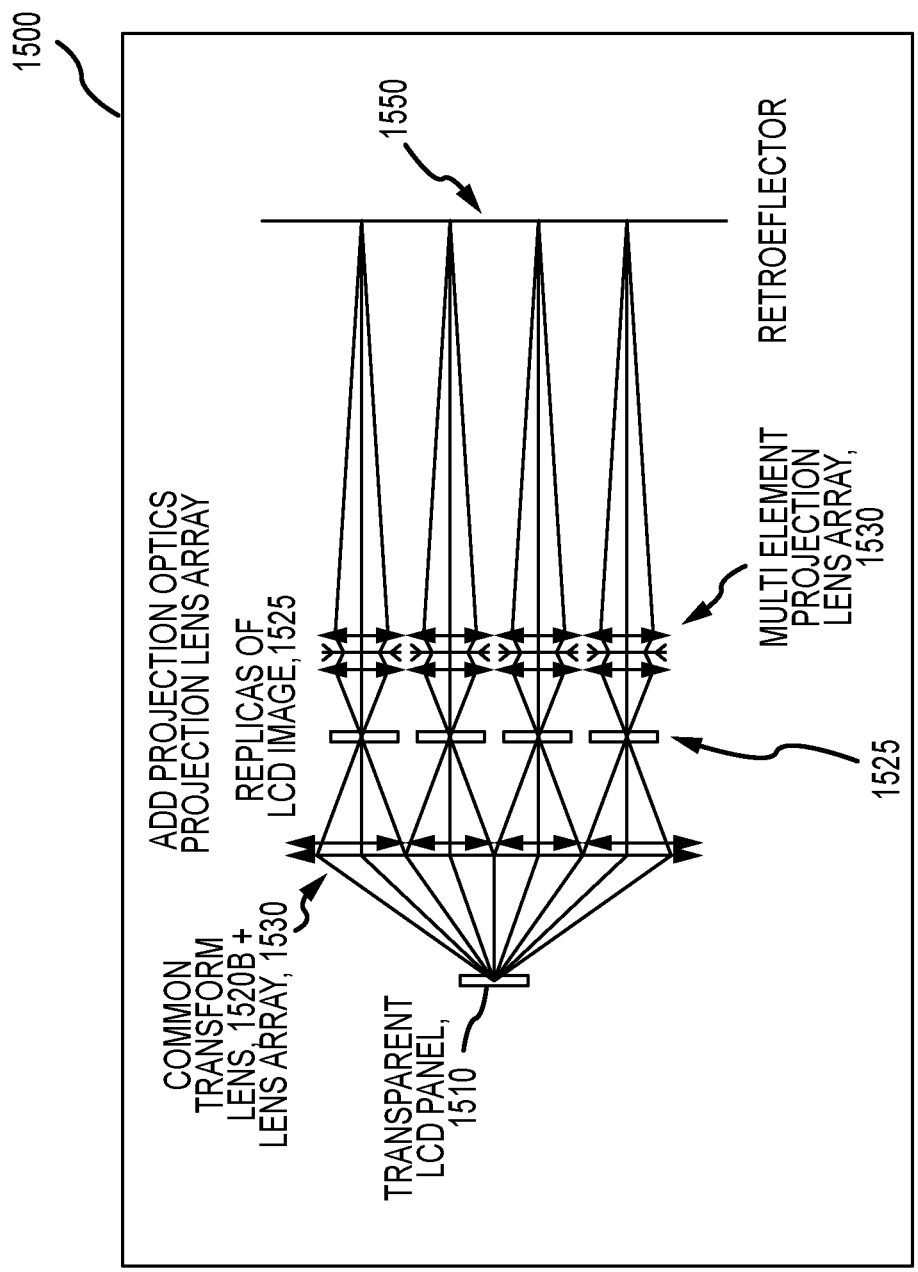
Figure 15G:
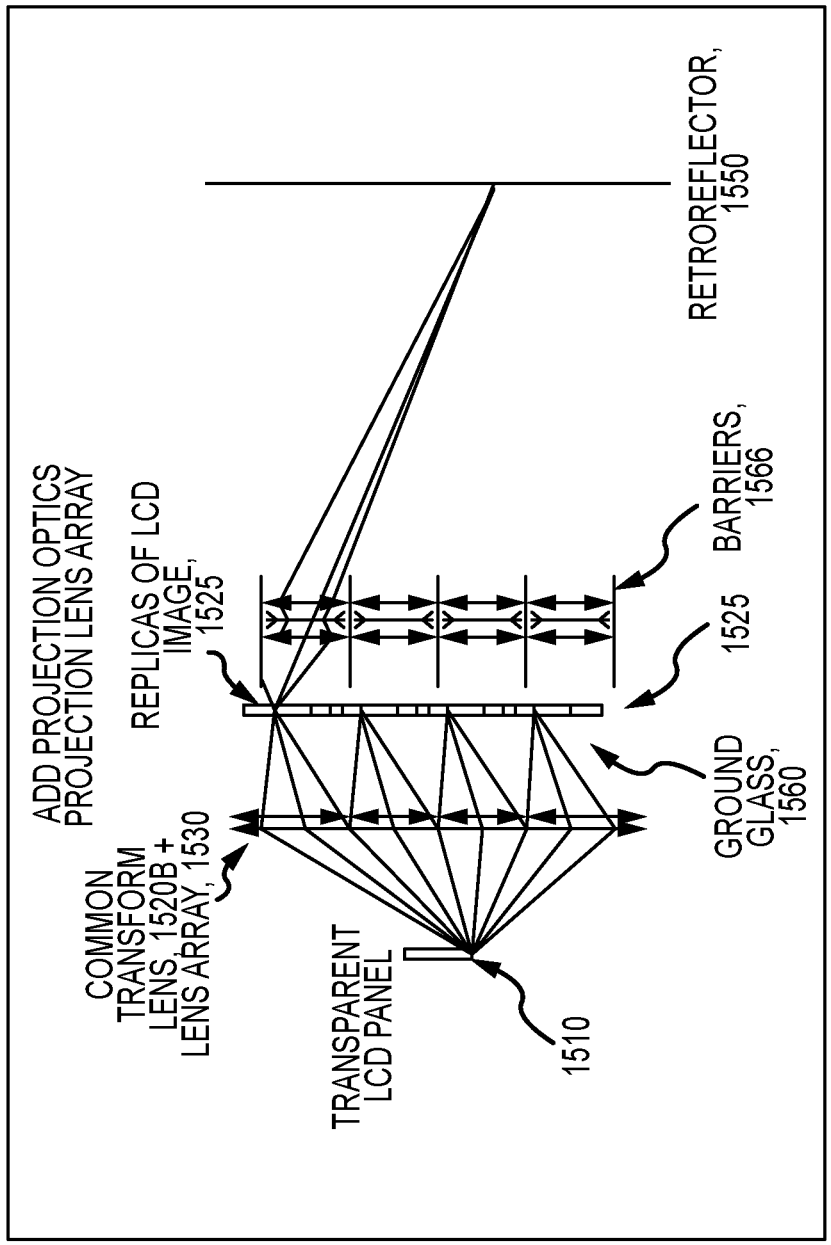

FIGS. 15F and 15G show that the system 1500 may further include a projection lens array 1530 that is placed behind the LCD image replica array (components 1510, 1520B, and 1530). Each of the replicas 1525 of the LCD image is projected and focused onto the retroreflector 1550 (in the solid-state autostereoscopic retroreflective projection display described above) by its corresponding multi-element projection lens in the projection lens array 1530.

Figure 15H:
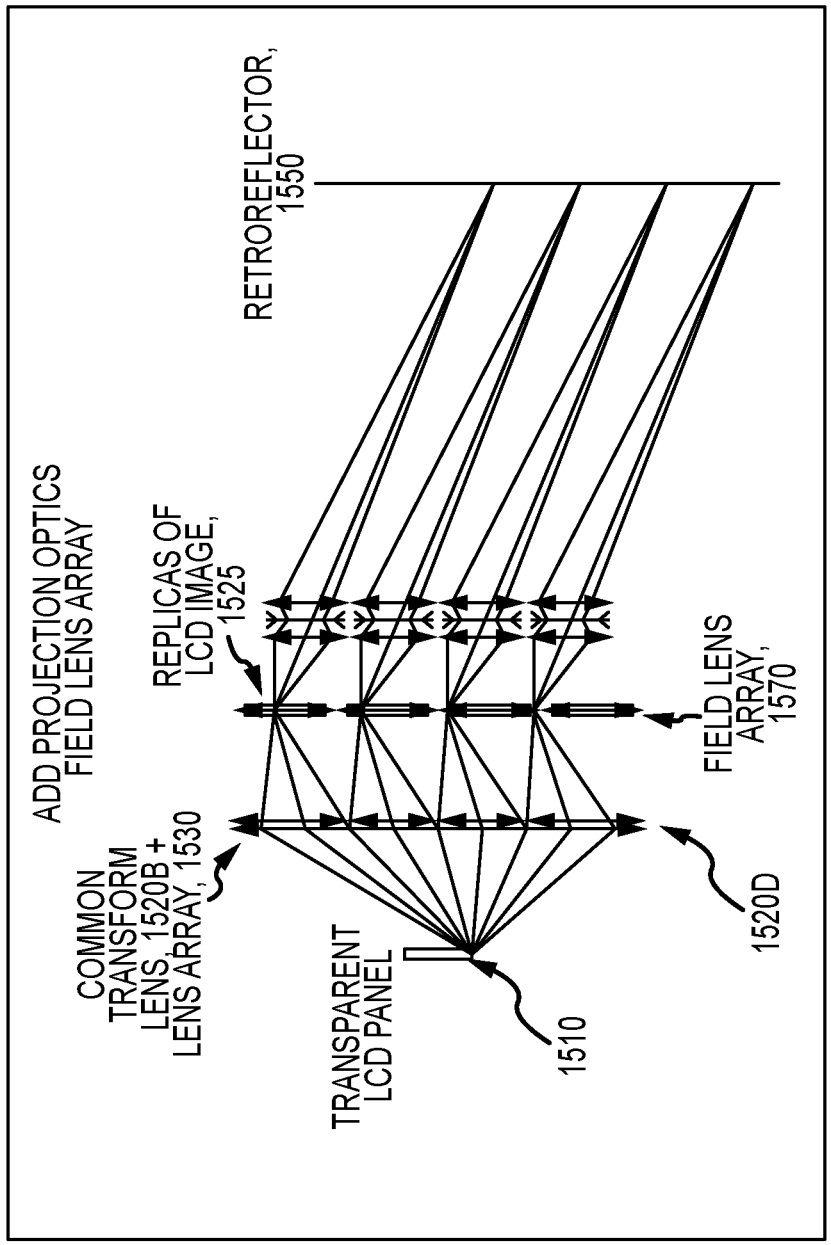
Figure 15I:
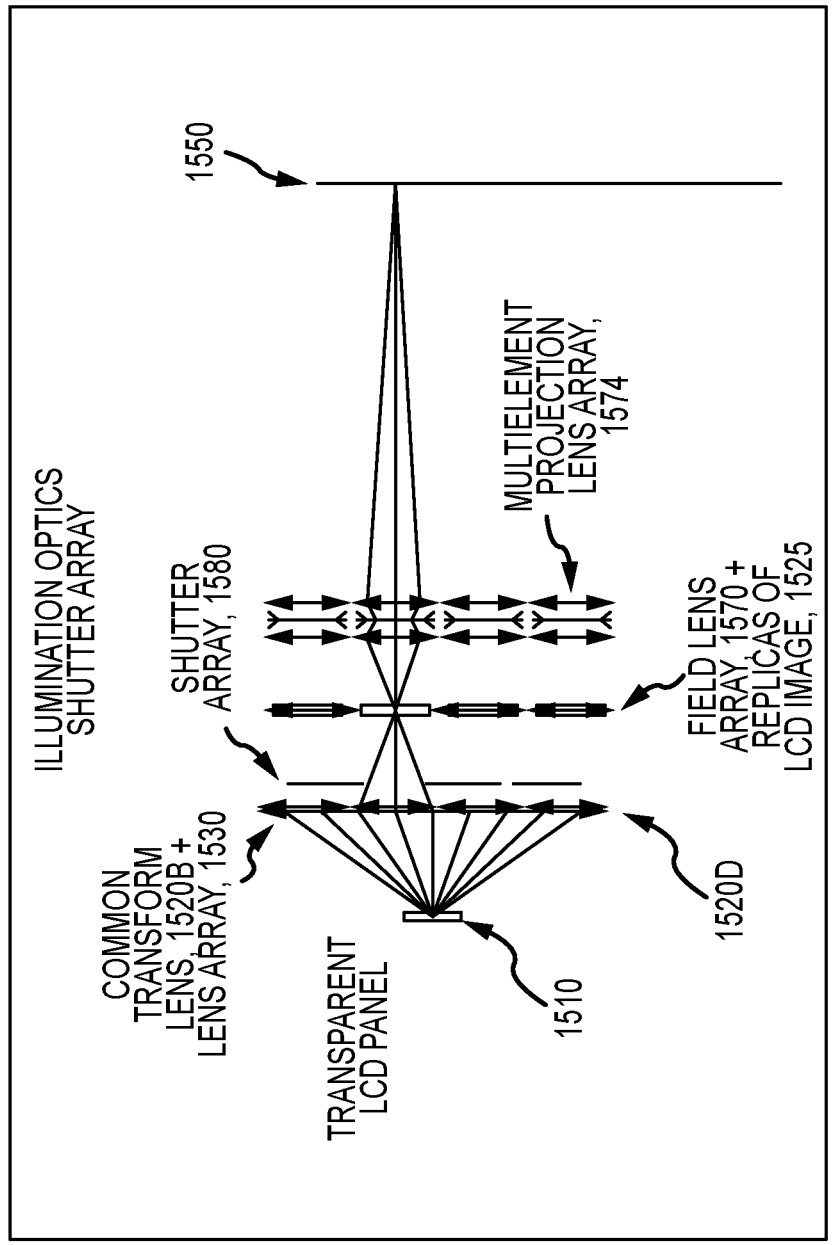

Light from off-axis points from LCD replicas 1525 may be directed away from and miss their corresponding projection lens in the lens array 1530. As shown in FIG. 15G, the LCD replicas 1525 may be projected onto a ground glass plate 1560 such that its light is scattered and some of its light enters the desired projection lenses. To prevent stray light from entering neighboring projection lenses, barriers 1566 can be placed between projection lenses. Alternatively, as shown in FIGS. 15H and 15I, a field lenslet within a field lens array 1570 may be placed at the LCD replica plane to redirect each replica image's light into its corresponding projection lens. As shown in FIG. 15I, at this point, light from the LCD panel 1510 emanates in all directions, and, therefore, each and every lens in the lenslet array 1530 of the replication optics 1520D and also its corresponding projection lens in the projection lens array 1574 are illuminated. Therefore, the LCD image is viewable from every eyebox in the viewing volume since an eyebox is a retroreflected real image of the projection aperture.

Figure 15J:
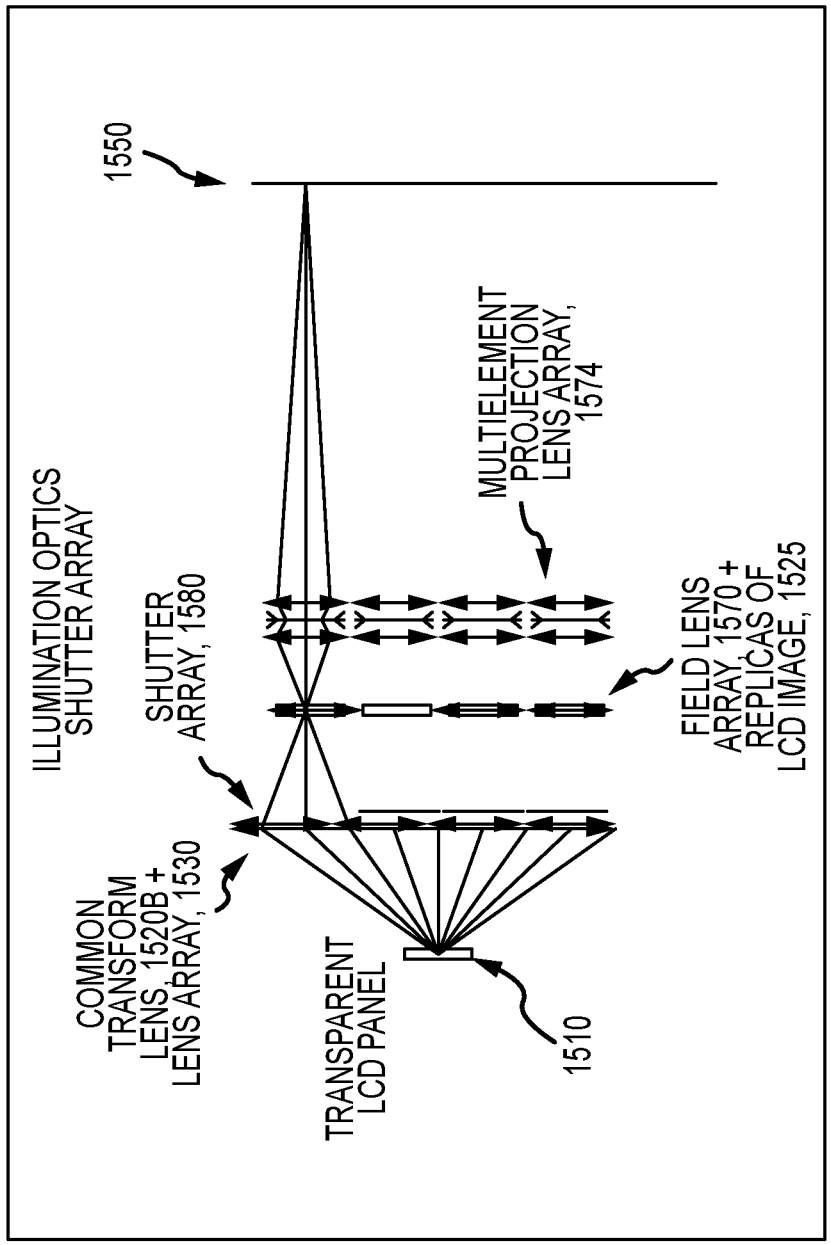
Figure 15K:
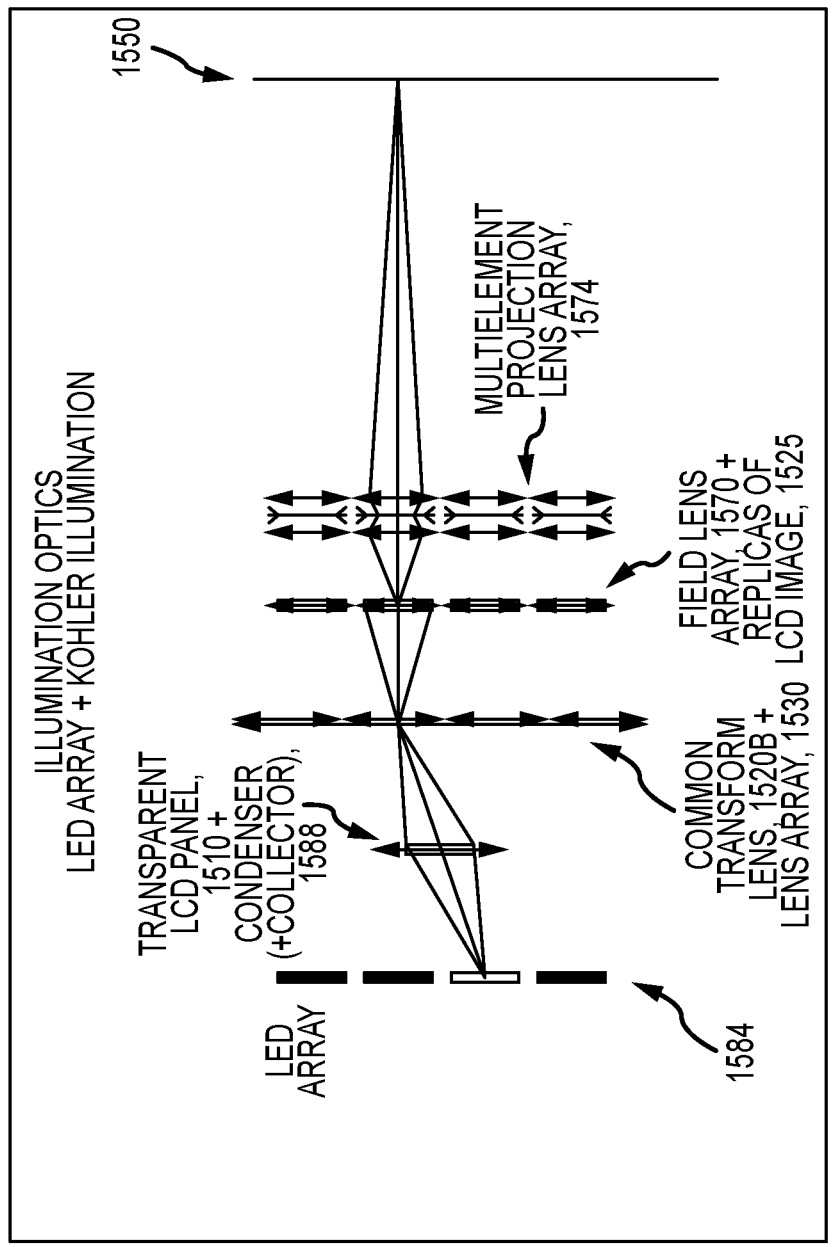
Figure 15L:
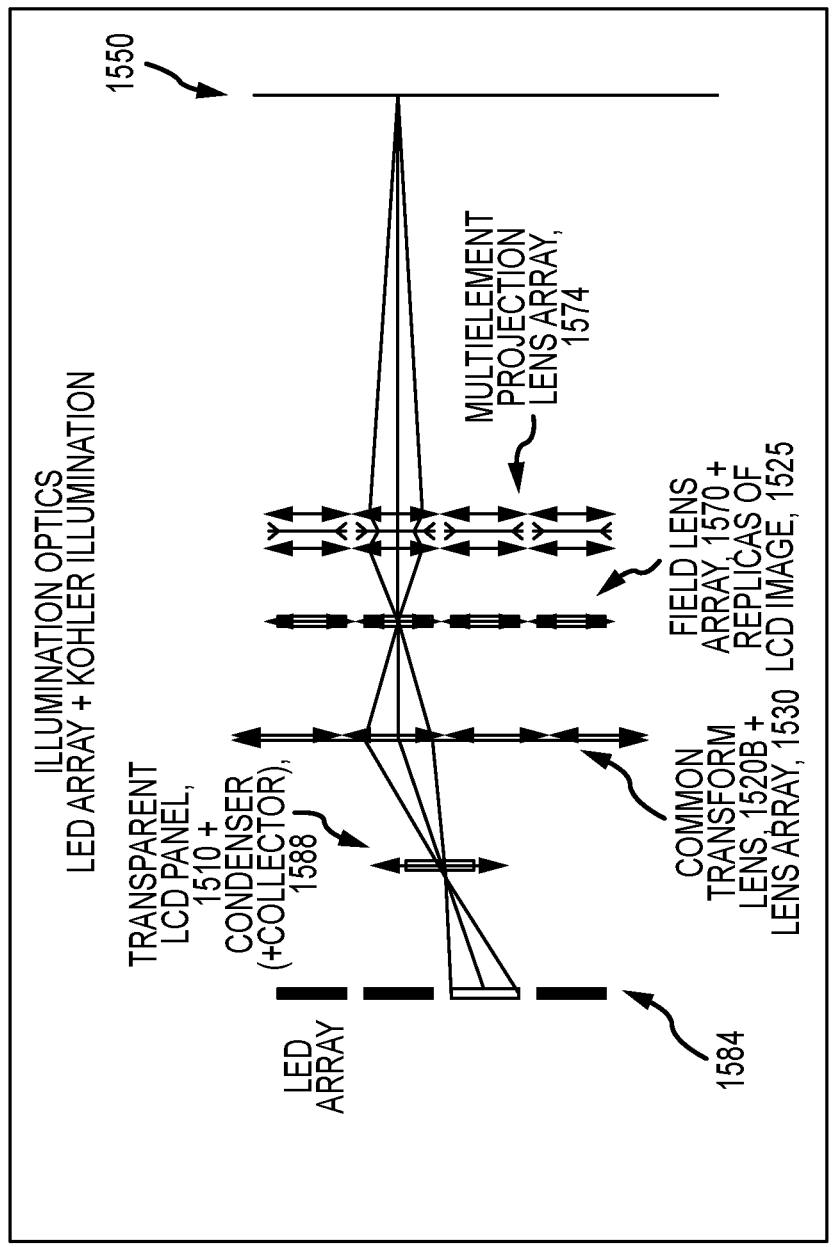
Figure 15M:
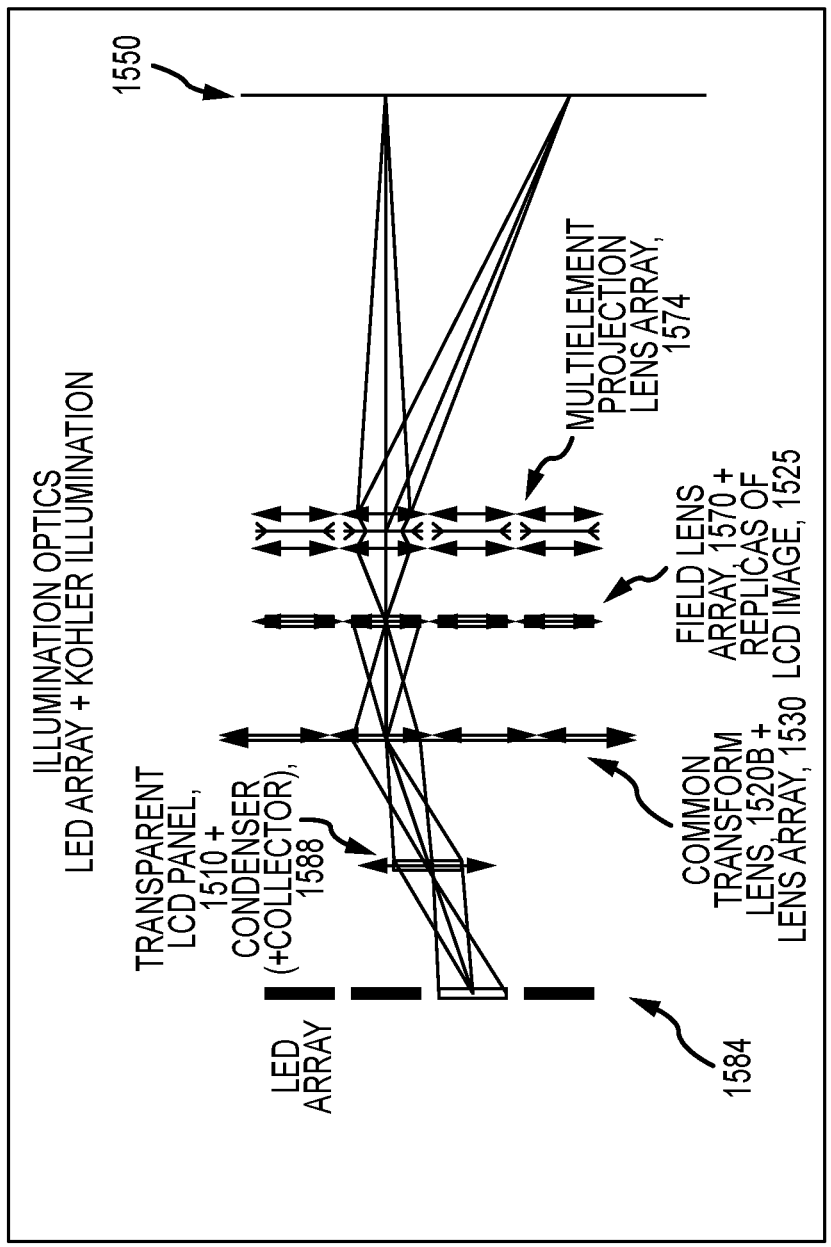
Figure 15N:
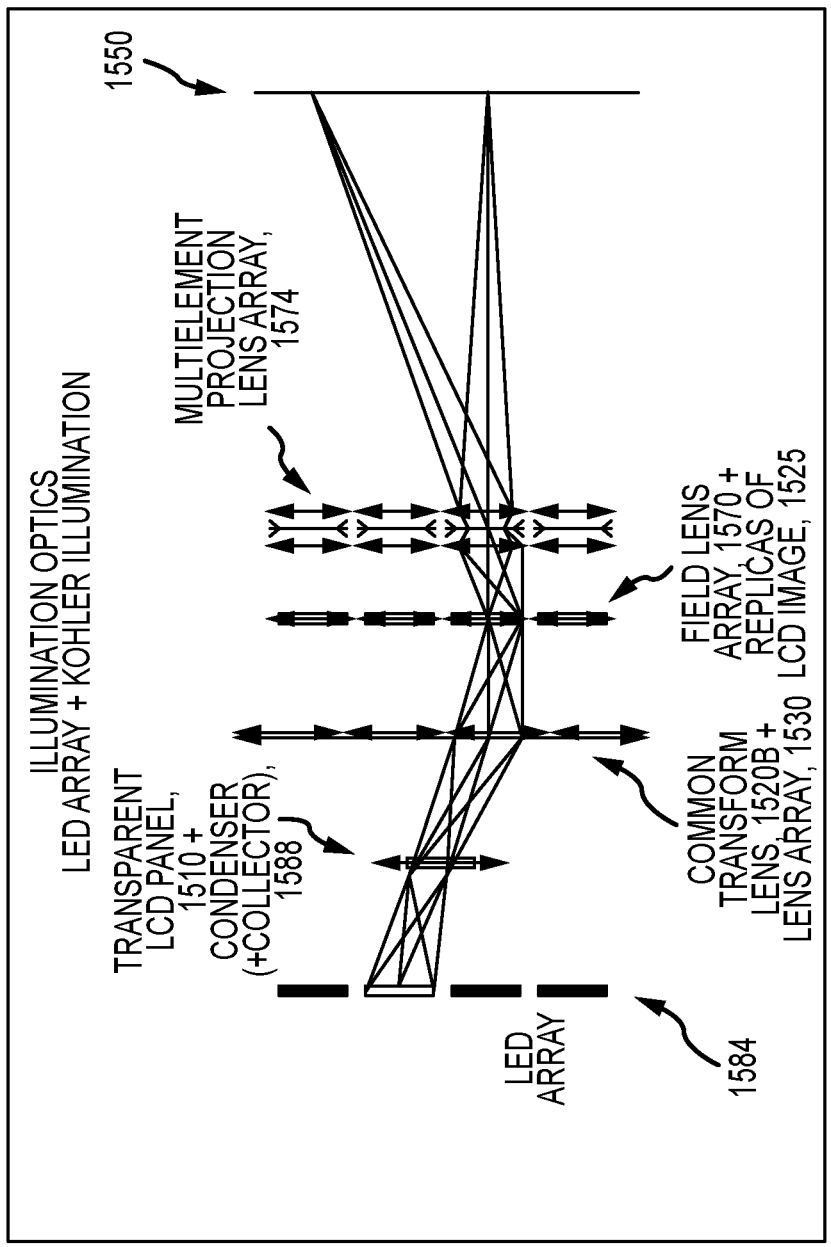

The multiple active eyeboxes are undesirable as this would not provide separate stereo imagery to the viewer's eyes. To provide imagery only to desired eyeboxes, a shutter array 1580 as shown in FIGS. 15I and 15J can be placed in front of the lens array 1570 in the replication optics, with one shutter per lens. This gates the light so that only one lens at a time forms a single LCD replica 1525 and is projected to the retroreflector screen 1550 and is viewable through one eyebox by the viewer. The shutter 1580 may be made from fast ferroelectric LCD material, Pi-cell, or the like such that shutters may rapidly become opaque or transparent (e.g., less than 11 ms switching time) so that the appropriate imagery can be presented at the appropriate eyebox corresponding to the user's tracked left and right eye positions.

Unfortunately, the use of shutters is not light efficient as all the lenslets are continuously illuminated even if light is not allowed to pass through the shutter. FIGS. 15K-15N illustrate the use of Köhler illumination (provided by combination of the LCD panel 1510 with a condenser and/or collector 1588) with a light array 1584 to improve light efficiency so light only passes through the entire LCD panel 1510 and only the desired lenses in both the replication lens array 1530 and the projection lens array 1574. The light array 1584 has one light corresponding to each lens in the replication optics lens array 1530 and the projection lens array 1574. Each light in the array 1584 can illuminate the transparent LCD panel 1510. In so doing, it picks up the image from the LCD panel 1510, and a condenser lens 1588 (at or near the LCD panel 1510) reimages that image content onto the corresponding lens in the replication optics lens array 1530. The light preferably is of finite extent such that its image fills the entire lens in the replication optics array 1530. To this end, each light in the light array 1584 may be an OLED panel or a diffused LED.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for providing a three-dimensional (3D) image-based visual effect, comprising:
    operating a projection assembly to project left eye images toward a reflective surface of a projection screen;
    operating the projection assembly to project right eye images toward the reflective surface of the projection screen; and
    concurrently with the operating of the projection assembly to project the left and right eye images, transmitting light from the projection assembly through a first side of a beamsplitter and receiving light from the projection screen on a second side of the beamsplitter,
    wherein the reflective surface comprises a retroreflector,
    wherein the beamsplitter is disposed between an outlet of the projection assembly and the reflective surface of the projection screen, and
    wherein the left and right eye images are viewable from a left eye position and a right eye position, respectively, within a viewing space adjacent and facing the second side of the beamsplitter, to allow a viewer with eyes positioned at the left and right eye positions to perceive a three-dimensional (3D) virtual object in a physical scenic space, opposite the second side of the beamsplitter, concurrently with light from a physical object or scenery in the physical scenic space.

2. The method of claim 1, further comprising tracking the left and right eye positions and rendering the left and right eye images as stereo images of a 3D scene for viewpoints matching the tracked left and right eye positions.

3. The method of claim 1, wherein the left and right eye images are provided in a variable and expandable set of locations that collectively constitute a viewing volume.

4. The method of claim 1, wherein the projection assembly comprises a left eye projector and a right eye projector projecting the left and right eye images, respectively, and wherein the method further comprises moving the left and right eye projectors to modify positions of eye boxes within a viewing volume to correspond with the left and right eye positions, respectively, for the viewer.

5. The method of claim 1, wherein the projection assembly is configured to project the left and right eye images using Köhler illumination.

6. The method of claim 1, wherein the projection assembly further comprises a shutter array, and the method further comprises operating the shutter array to switch between a left eye shutter and a right eye shutter to emit the left and right eye images, respectively, in a time multiplexed manner during tracking of the left and right eye positions to provide stereo imagery, and wherein the left and right eye shutters vary with changes in the left and right eye positions.

7. The method of claim 1, wherein the projection assembly comprises a light emitting diode (LED) array as a light source for the left and right eye images, and wherein the method further comprises operating the LED array to switch among individual LEDs of the LED array to emit the left and right eye images in a time multiplexed manner based on tracking of the left and right eye positions to alternate between providing a left eye viewpoint at the left eye position and a right eye viewpoint at the right eye position.

8. The method of claim 7, wherein the projection assembly further comprises a projection lens comprising a concave mirror, a beamsplitter disposed between the concave mirror and the LED array, and a quarter-wave film disposed between the concave mirror and the beamsplitter of the projection lens.

9. The method of claim 7, wherein a one-dimensional (1D) diffuser is disposed between the reflective surface and the beamsplitter.

10. The method of claim 1, wherein the projection assembly is configured to use retroreflective autostereo projection including retroreflected illumination to provide the left and right eye images.

11. The method of claim 7, wherein the projection assembly further comprises:
    a polarization selective beamsplitter disposed at a 45-degree angle between the LED array and the reflective surface of the projection screen;
    a transparent liquid crystal display (LCD) with a backing film comprising a polarization-preserving retroreflector;
    a projection mirror, wherein the polarization selective beamsplitter is disposed between the transparent LCD and the projection mirror with the backing film on a side of the transparent LCD opposite the projection mirror; and
    a quarter-wave film or plate disposed between the projection mirror and the polarization selective beamsplitter.

12. The method of claim 1, wherein the retroreflector providing the reflective surface of the projection screen comprises a polarization-preserving retroreflective screen, wherein the beamsplitter comprises a polarization selective mirror, and wherein the projection assembly further comprises a polarization wave plate disposed between the beamsplitter and the reflective surface of the projection screen.

13. The method of claim 7, wherein the projection assembly further comprises:
    a polarization selective beamsplitter with a first side at a 45-degree angle to the reflective surface of the projection screen and with the first side facing the LED array;
    a transparent liquid crystal display (LCD) facing a second side of the polarization selective beamsplitter and having a backing film comprising a polarization-preserving retroreflector opposite the LED array;
    a projection mirror comprising a curved half-mirrored projection mirror with a concave side facing the transparent LCD and with a convex side facing the LED array;
    a quarter-wave film or plate disposed between the projection mirror and the polarization selective beamsplitter; and a circular polarizer disposed between the LED array and the convex side of the projection mirror.

14. The method of claim 13, wherein the retroreflector providing the reflective surface of the projection screen comprises a polarization-preserving retroreflective screen, wherein the beamsplitter comprises a polarization selective mirror, and wherein the projection assembly further comprises a polarization wave plate disposed between the beamsplitter and reflective surface of the projection screen.

15. The method of claim 1, further comprising displaying a mask providing light occlusion in the physical scenic space for the 3D virtual object.

16. The method of claim 1, wherein the projection screen, the beamsplitter, and the projection assembly are mounted upon a vehicle body or upon a display structure.

17. The method of claim 1, wherein the projection screen is mounted on a ceiling or surface defining the physical scenic space, and wherein the projection assembly is mounted adjacent the physical scenic space to emit light onto the reflective surface of the projection screen.

18. The method of claim 1, wherein the projection assembly is mounted on a vehicle or adjacent the physical scenic space, and wherein the projection screen and the beamsplitter are positioned in or adjacent to the physical scenic space.

19. A method for providing a 3D image-based visual effect, comprising:
tracking left and right eye positions proximate to a second side of a beamsplitter that is disposed between an outlet of a projection assembly and a reflective surface of a projection screen, wherein the beamsplitter is configured to transmit light from the projection assembly through a first side and receive light from the projection screen on the second side, and wherein the reflective surface comprises a retroreflector; and
emitting, with the projection assembly, stereo images toward the reflective surface of the projection screen, wherein the stereo images are directed to tracked left and right eye positions,
wherein the stereo images are rendered for viewpoints matching the tracked left and right eye positions, and
wherein the stereo images are provided in eye boxes containing the tracked left and right eye positions.

20. The method of claim 19, wherein the projection assembly comprises a left eye projector and a right eye projector projecting the stereo images, and wherein the method further comprises moving the left and right eye projectors to modify the eye boxes containing the stereo images to match the tracked left and right eye positions.

21. The method of claim 19, wherein the projection assembly further comprises a shutter array, and wherein the method further comprises operating the shutter array to switch between a left eye shutter and a right eye shutter to emit the stereo images, respectively, in a time multiplexed manner during tracking of the left and right eye positions to provide stereo imagery, and wherein the left and right eye shutters vary with changes in the left and right eye positions.

22. The method of claim 19, wherein the projection assembly further comprises a light emitting diode (LED) array as a light source for the stereo images, and wherein the method further comprises operating the LED array to switch among individual LEDs of the LED array to emit the stereo images in a time multiplexed manner based on tracking of the left and right eye positions to alternate between providing a left eye viewpoint at the left eye position and a right eye viewpoint at the right eye position.

23. The method of claim 22, wherein the projection assembly further comprises a projection lens comprising a concave mirror, a beamsplitter disposed between the concave mirror and the LED array, and a quarter-wave film disposed between the concave mirror and the beamsplitter of the projection lens.

24. The method of claim 19, wherein the projection assembly uses retroreflective autostereo projection including retroreflected illumination to provide the stereo images.

25. The method of claim 19, further comprising displaying a mask providing light occlusion for the 3D image-based virtual effect.

26. The method of claim 19, wherein the projection screen, the beamsplitter, and the projection assembly are mounted upon a vehicle body or upon a display structure.

27. The method of claim 19, wherein the projection screen is mounted on a ceiling or surface defining a physical space, and wherein the projection assembly is mounted adjacent the physical space to emit light onto the reflective surface of the projection screen.

28. The method of claim 19, wherein the projection assembly is mounted on a vehicle or adjacent a physical space, and wherein the projection screen and the beamsplitter are positioned in or adjacent to the physical space.

29. A method for providing a 3D image-based visual effect, comprising:
positioning a beamsplitter between an outlet of a projection assembly and a retroreflective surface of a screen, wherein the beamsplitter is configured to transmit light from the projection assembly through a first side and to receive light from the projection screen on a second side;
tracking a left eye position and a right eye position of a viewer in a viewing space and facing the second side of the beamsplitter;
operating the projection assembly to project left and right eye images toward the retroreflective surface of the projection screen; and
directing light from a surface of a physical object in a physical scenic space toward the viewing space,
wherein the left and right eye images are directed to the tracked left eye position and the tracked right eye position, respectively, of the viewer,
wherein light reflected from the second side of the beamsplitter is directed into the viewing space, and
wherein the left and right eye images are stereo images rendered for viewpoints matching the tracked left and right eye positions.

30. The method of claim 29, wherein the projection assembly comprises an array of LEDs, and the method further comprises operating the array of LEDs to illuminate a transparent LCD panel, and wherein a mirrored egg-crate structure is placed over the array of LEDs such that each LED is surrounded by four reflective walls to form a plurality of individually addressable illumination cells.

31. The method of claim 30, wherein each of the cells comprises a floor including a Lambertian scatterer.

32. The method of claim 30, wherein each of the cells comprises a roof comprising a polarization selective mirror.

33. The method of claim 29, wherein the projection assembly comprises an LCD panel, a projection lens array, and replication optics disposed between the LCD panel and the projection lens array, and wherein the method further comprises replicating imagery from the LCD panel onto a lens of the projection lens array corresponding to one of the tracked left and right eye positions.

34. The method of claim 33, wherein the replication optics comprises a transform lens collimating light output by the LCD panel and a replication optic lens array disposed between the transform lens and the projection lens array.

35. The method of claim 34, wherein the replication optics further comprises a field lens array disposed between the replication optics lens array and the projection lens array at a plane of replicated images of the imagery from the LCD panel.

36. The method of claim 35, wherein the projection assembly further comprises a shutter array disposed between the replication optics lens array and the field lens array, the shutter array comprising one shutter per lens of the replication optics lens array to project one of the replicated images onto the retroreflective surface at a time.

37. The method of claim 34, wherein the LCD panel is configured for Köhler illumination, wherein the projection assembly further comprises an array of LEDs, and wherein each of the LEDs corresponds to one lens in the replication optics lens array.

38. The method of claim 34, wherein the replication optics further comprises a ground glass plate disposed between the replication optic lens array and the projection lens array to scatter received light on desired lenses in the projection lens array, and wherein the replication optics further comprises barriers placed between lenses in the projection lens array to prevent stray light from entering lenses in the projection lens array that neighbor the desired lenses.

\* \* \* \* \*